US011707852B1

(12) United States Patent
Hurst et al.

(10) Patent No.: US 11,707,852 B1
(45) Date of Patent: Jul. 25, 2023

(54) GRIPPERS FOR ROBOTIC MANIPULATION OF OBJECTS AND RELATED TECHNOLOGY

(71) Applicant: Agility Robotics, Inc., Pittsburgh, PA (US)

(72) Inventors: Jonathan Hurst, Albany, OR (US); Kevin Sweeney, Albany, OR (US); Dylan Thrush, Corvallis, OR (US)

(73) Assignee: Agility Robotics, Inc., Tangent, OR (US)

( * ) Notice: Subject to any disclaimer, the term of this patent is extended or adjusted under 35 U.S.C. 154(b) by 0 days.

(21) Appl. No.: 18/055,132

(22) Filed: Nov. 14, 2022

Related U.S. Application Data

(60) Provisional application No. 63/382,447, filed on Nov. 4, 2022.

(51) Int. Cl.
*B25J 18/00* (2006.01)
*B25J 11/00* (2006.01)
*B25J 13/08* (2006.01)

(52) U.S. Cl.
CPC ......... *B25J 18/007* (2013.01); *B25J 11/008* (2013.01); *B25J 13/081* (2013.01)

(58) Field of Classification Search
CPC .... B25J 18/007; B25J 11/008; B25J 11/0045; B25J 13/081; B25J 15/0014;
(Continued)

(56) References Cited

U.S. PATENT DOCUMENTS

| 4,643,473 A | * | 2/1987 | Douglas | ................. B25J 9/1025 623/64 |
| 5,108,140 A | * | 4/1992 | Bartholet | ............. B25J 15/0009 294/115 |

(Continued)

FOREIGN PATENT DOCUMENTS

| CN | 106737835 A | * | 5/2017 | |
| DE | 102015216550 A1 | * | 3/2017 | .......... B25J 15/0033 |

(Continued)

OTHER PUBLICATIONS

Screen captures from YouTube video clip entitled "how to lift heavy things", uploaded on Mar. 9, 2015 by user "Aaron Friend". Retrieved from internet: <https://www.youtube.com/watch?v=FFXSa35WOHs>. (Year: 2015).*

*Primary Examiner* — T. Scott Fix

(57) ABSTRACT

A robot in accordance with at least some embodiments of the present technology is configured for bimanual manipulation of objects. The robot includes a body and two arms individually defining an arm length and including an end effector, an end effector joint proximally adjacent to the end effector along a kinematic chain corresponding to the arm, and a gripper proximal to the end effector along the arm length. The end effector joint is configured to rotate the end effector relative to the gripper. The robot is configured to move at least a portion of a bottom surface of an object away from a support surface by applying force to the object via frictional interfaces between convex gripping surfaces of the grippers and side surfaces of the object. This creates a gap into which paddles of the end effectors can be inserted to support the object from below.

20 Claims, 27 Drawing Sheets

(58) Field of Classification Search
CPC .................. B25J 15/0019; B25J 15/0028;
B25J 15/0038; B25J 15/103
USPC ............................................... 74/490.01
See application file for complete search history.

(56) References Cited

U.S. PATENT DOCUMENTS

| | | | |
|---|---|---|---|
| 9,981,389 B2 | 5/2018 | Kennedy et al. | |
| 2007/0239315 A1 | 10/2007 | Sato et al. | |
| 2012/0072022 A1* | 3/2012 | Kim ................. | B25J 9/1666 |
| | | | 700/255 |
| 2012/0078419 A1* | 3/2012 | Kim ................. | B25J 9/1669 |
| | | | 700/255 |
| 2019/0248003 A1 | 8/2019 | Nagarajan et al. | |
| 2020/0055152 A1 | 2/2020 | Dalle et al. | |
| 2020/0206948 A1* | 7/2020 | Olivier ................. | B25J 15/103 |
| 2021/0291384 A1* | 9/2021 | Chintalapalli Patta ................. | |
| | | | B25J 15/0616 |
| 2021/0331327 A1* | 10/2021 | Lee .................. | B25J 15/0052 |
| 2022/0258342 A1 | 8/2022 | Gildert et al. | |
| 2022/0314443 A1 | 10/2022 | Gienger | |

FOREIGN PATENT DOCUMENTS

| | | | | |
|---|---|---|---|---|
| DE | 102019218133 A1 | * | 5/2021 | |
| JP | 2002128027 A | * | 5/2002 | |
| JP | 2016150409 A | * | 8/2016 | ............ B25J 17/00 |
| JP | 2022161054 A | * | 10/2022 | |
| KR | 100943240 B1 | * | 2/2010 | |
| WO | WO-2015112018 A1 | * | 7/2015 | .......... B25J 15/0014 |

* cited by examiner

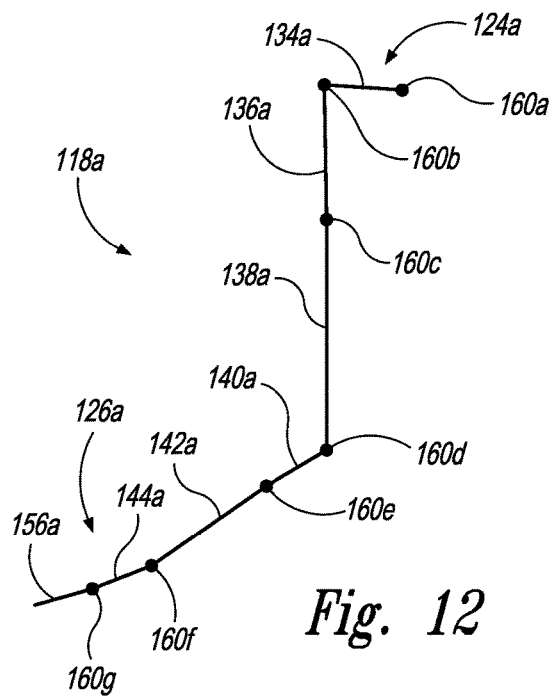
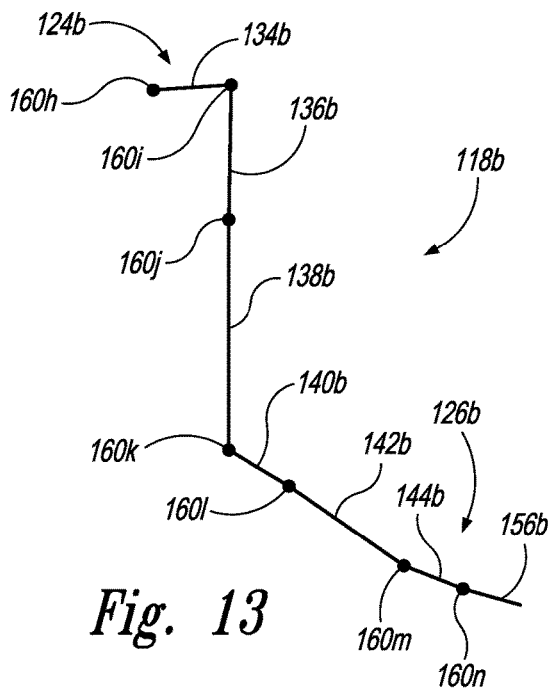
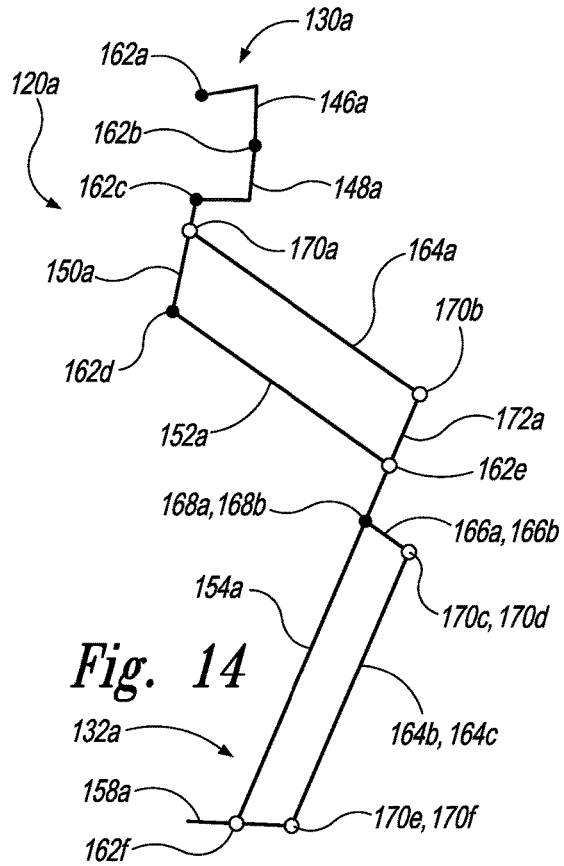
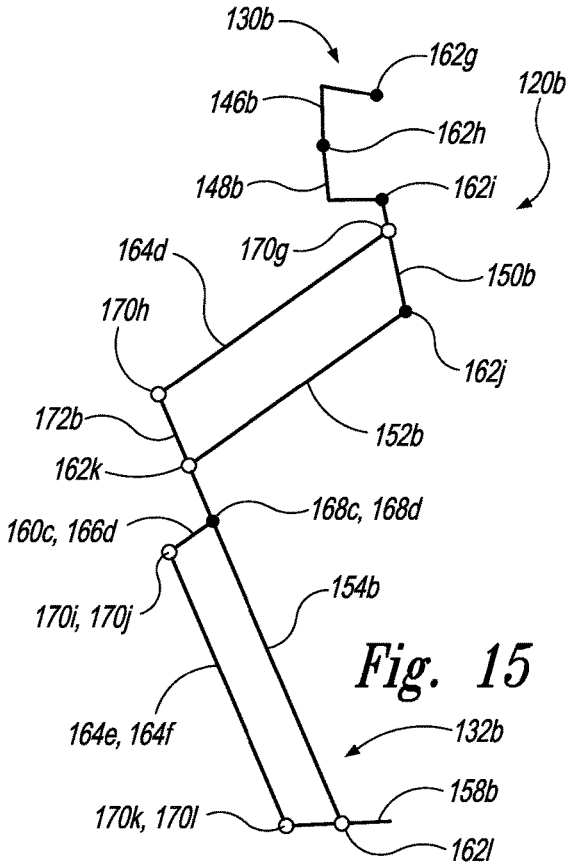

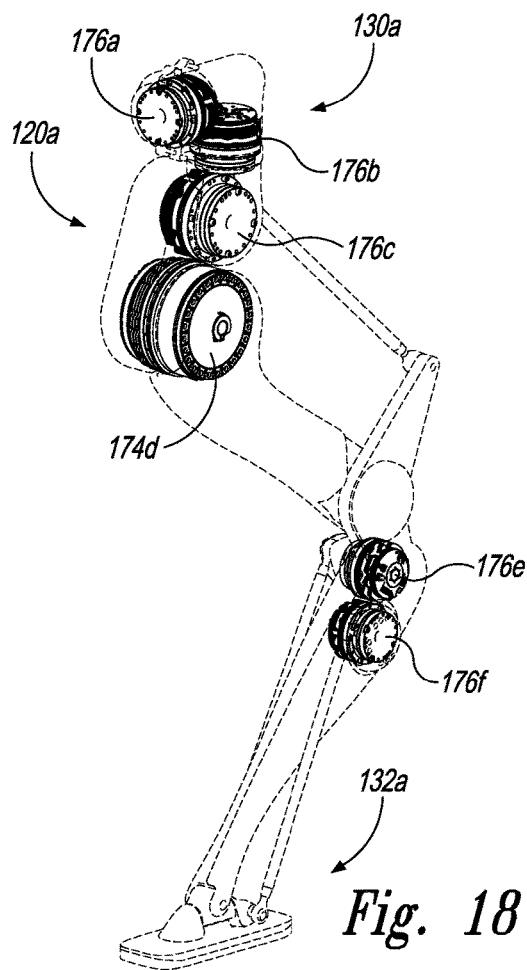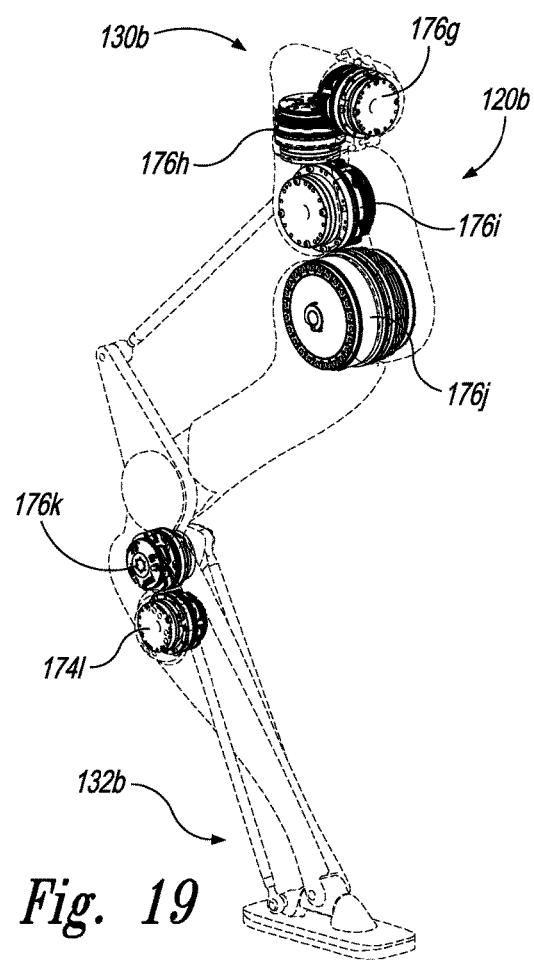
Fig. 18    Fig. 19
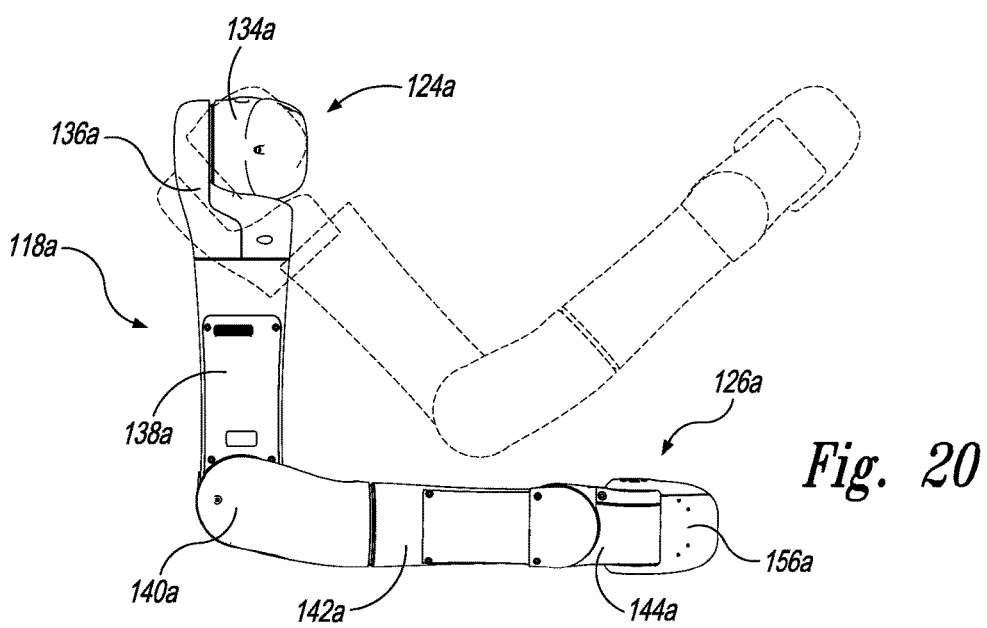
Fig. 20

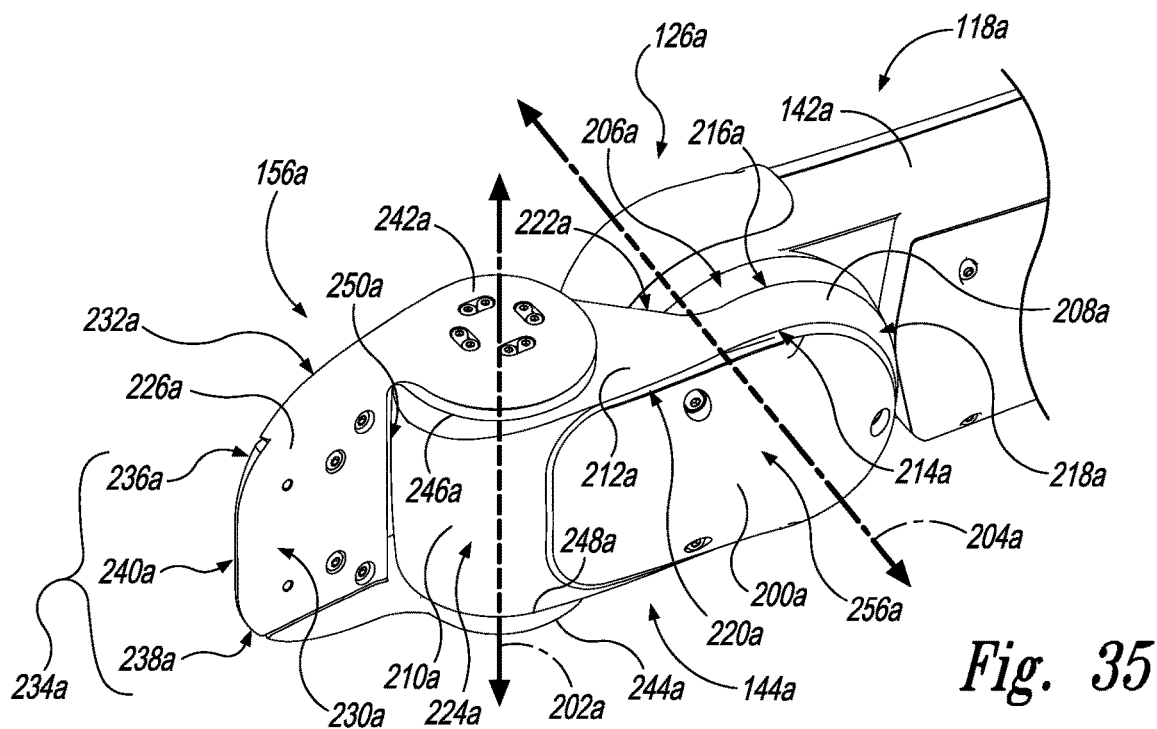
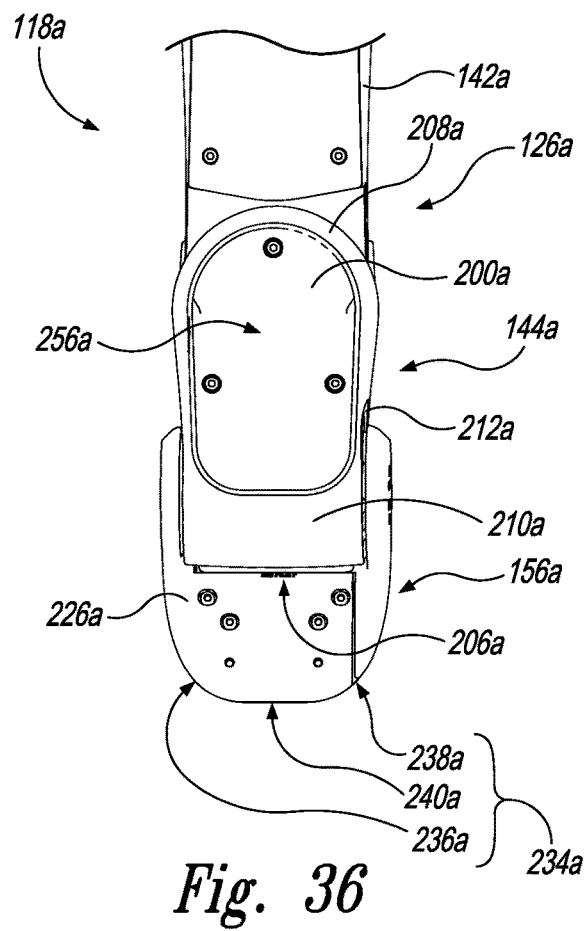
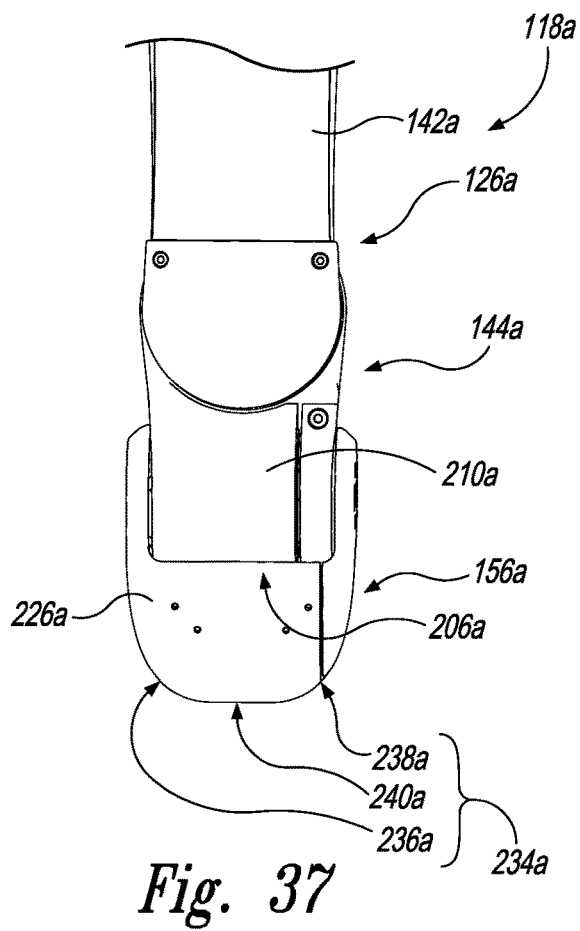
Fig. 35
Fig. 36
Fig. 37

GRIPPERS FOR ROBOTIC MANIPULATION OF OBJECTS AND RELATED TECHNOLOGY

CROSS-REFERENCE TO RELATED APPLICATION

This claims the benefit of U.S. Provisional Application No. 63/382,447, filed Nov. 4, 2022. The foregoing application is incorporated herein by reference in its entirety. To the extent the foregoing application and/or any other material incorporated herein by reference conflicts with the present disclosure, the preset disclosure controls.

TECHNICAL FIELD

The present technology relates to robots that manipulate objects.

BACKGROUND

Many simple tasks that humans currently perform are amenable to automation using robotics. Among such tasks are those involving moving goods between locations within distribution centers. For example, after a trailer or pallet containing goods arrives at a distribution center, humans typically move the goods from the trailer or pallet onto a conveyor that carries the goods to other locations within the distribution center for further processing. Similarly, although a conveyor can be used to deliver outgoing goods to a loading dock or palletizing station, humans are still needed to move the goods from the conveyor to outgoing trailers or pallets. Despite the apparent simplicity of loading and unloading trailers and pallets, these tasks have conventionally been difficult or impossible to fully automate. As another example, humans at distribution centers that handle order fulfillment for electronic commerce are often tasked with picking and packing goods for last mile delivery. These distribution centers are massive in scale and handle a wide variety of goods. Even with the aid of sophisticated route optimization systems, locating and retrieving goods to fill orders as needed tends to be labor intensive.

In the forgoing examples and in other cases, the use of human labor to perform repetitive and time-consuming tasks is inefficient. Human labor would be far better applied to more complex tasks, particularly those involving creativity or advanced problem solving. Presently, however, the need for distribution centers and humans to operate them is large and increasing rapidly as consumers shift toward electronic commerce. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

FIGS. 12-15 are partially schematic diagrams showing kinematic chains corresponding to the first arm, the second arm, the first leg, and the second leg of the robot shown in FIG. 1.

FIGS. 16-19 are partially transparent perspective views of the first arm, the second arm, the first leg, and the second leg, respectively, of the robot shown in FIG. 1.

FIG. 20 is a side profile view of the first arm of the robot shown in FIG. 1 indicating isolated motion about an arm joint of the robot.

FIG. 35 is a perspective view of a portion of the first arm of the robot shown in FIG. 1.

FIGS. 36 and 37 are, respectively, a first side profile view and an opposite second side profile view of a portion of the first arm of the robot shown in FIG. 1.

DETAILED DESCRIPTION

Figure 1:
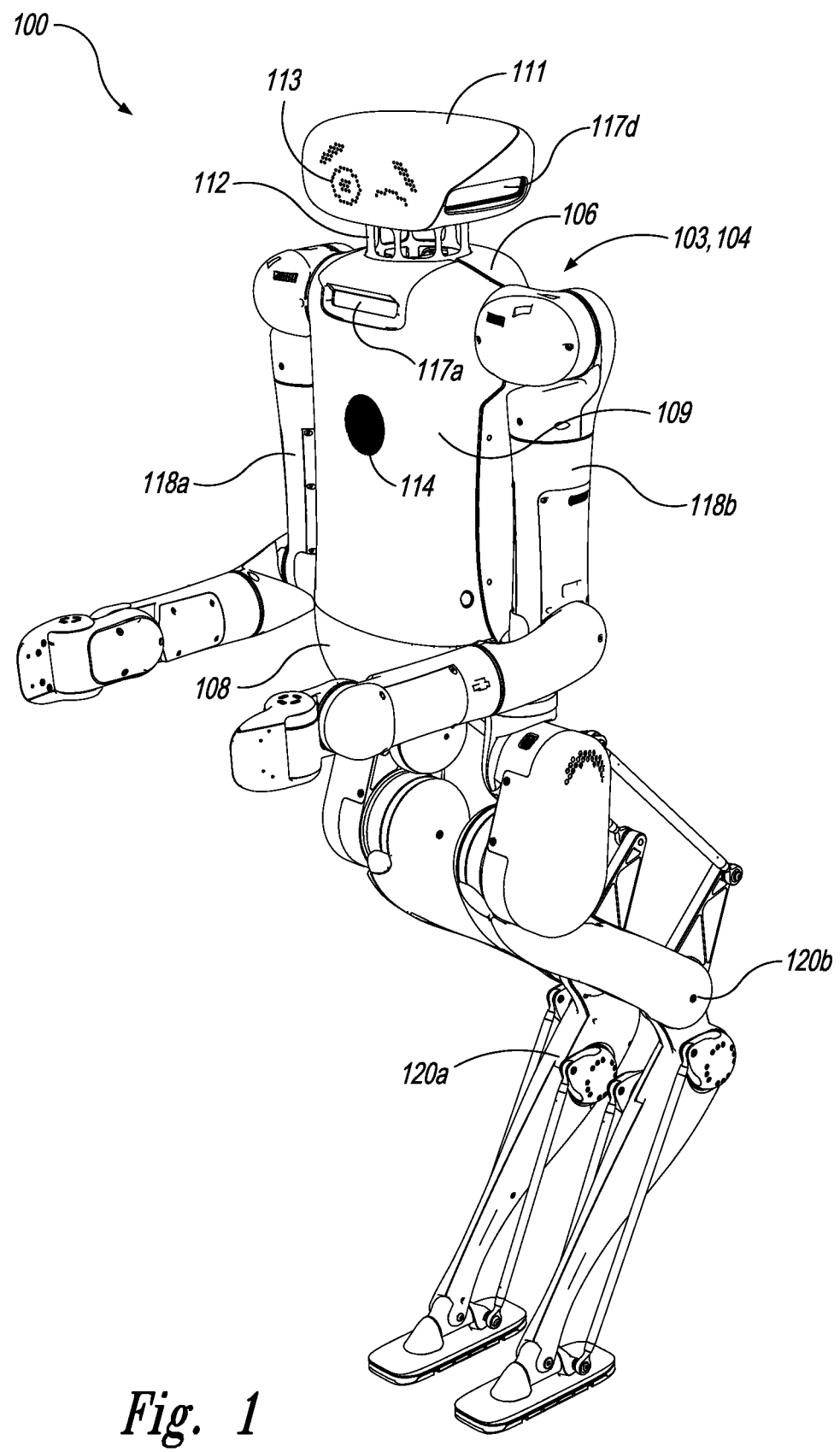
FIGS. 1 and 2 are different perspective views of a robot in accordance with at least some embodiments of the present technology with the robot being in a first state.

Disclosed herein are robots and associated devices, systems, and methods. Robots in accordance with at least some embodiments of the present technology include innovative features that facilitate moving objects while the objects are at least partially supported from below the objects rather than only supported from the top and/or sides of the objects. This can be useful, for example, to increase the reliability of the support and/or to reduce or prevent damage to the objects. In contrast to object support from below, object support from only the top or one side of an object (e.g., by suction) is far more prone to failure. Also in contrast to object support from below, object support from only two sides of an object (e.g., by squeezing) is far more prone to damaging the object. A challenge of supporting an object at least partially from below, however, is that a bottom surface of an object may not be readily accessible. In the case of a box resting on a flat support surface (e.g., a table, a shelf, etc.), for example, there may be no gap between the box and the support surface that would admit an end effector. Moreover, forcing an end effector under a box in this state is likely to damage the box, especially when the box is heavy. Robots in accordance with at least some embodiments of the present technology include features that at least partially address this problem, among others.

A robot in accordance with at least some embodiments of the present technology includes both end effectors and grippers proximal to the end effectors. The end effectors can serve at least primarily to support an object from below the object during a prolonged operation, such as while the robot carries the object between locations within a distribution center. The grippers, in contrast, can serve at least primarily to support the object temporarily from the sides of the object. Accordingly, the grippers can facilitate shifting an object away from a support surface enough to allow the end effectors to be positioned under the object. In at least some cases, the grippers include features that promote strong frictional contact with vertical and/or near-vertical side surfaces of an object. Furthermore, the grippers can include features that promote maneuverability of an object during various robotic operations involving shifting the object. For example, a gripper in accordance with at least some embodiments of the present technology includes a convex gripping surface that maintains contact with a side surface of an object even as the object rotates relative to the gripper and/or as the gripper rotates relative to the object. These and other features of robots and associated devices, systems, and methods in accordance with various embodiments of the present technology are further described below with reference to FIGS. 1-56.

Although devices, systems, and methods may be described herein primarily or entirely in the context of robotic, bimanual manipulation of boxes, other contexts are within the scope of the present technology. For example, suitable features of described devices, systems, and methods can be implemented in the context of robotically manipulating boxes using only one or more than two robotic arms. As another example, suitable features of described devices, systems, and methods can be implemented in the context of robotically manipulating objects other than boxes, such as totes, crates, non-packaged hard goods, irregularly shaped objects, etc. Furthermore, it should be understood, in general, that other devices, systems, and methods in addition to those disclosed herein are within the scope of the present disclosure. For example, devices, systems, and methods in accordance with embodiments of the present technology can have different and/or additional configurations, components, procedures, etc. than those disclosed herein. Moreover, devices, systems, and methods in accordance with embodiments of the present disclosure can be without one or more of the configurations, components, procedures, etc. disclosed herein without deviating from the present technology.

Robot Systems

Figure 2:
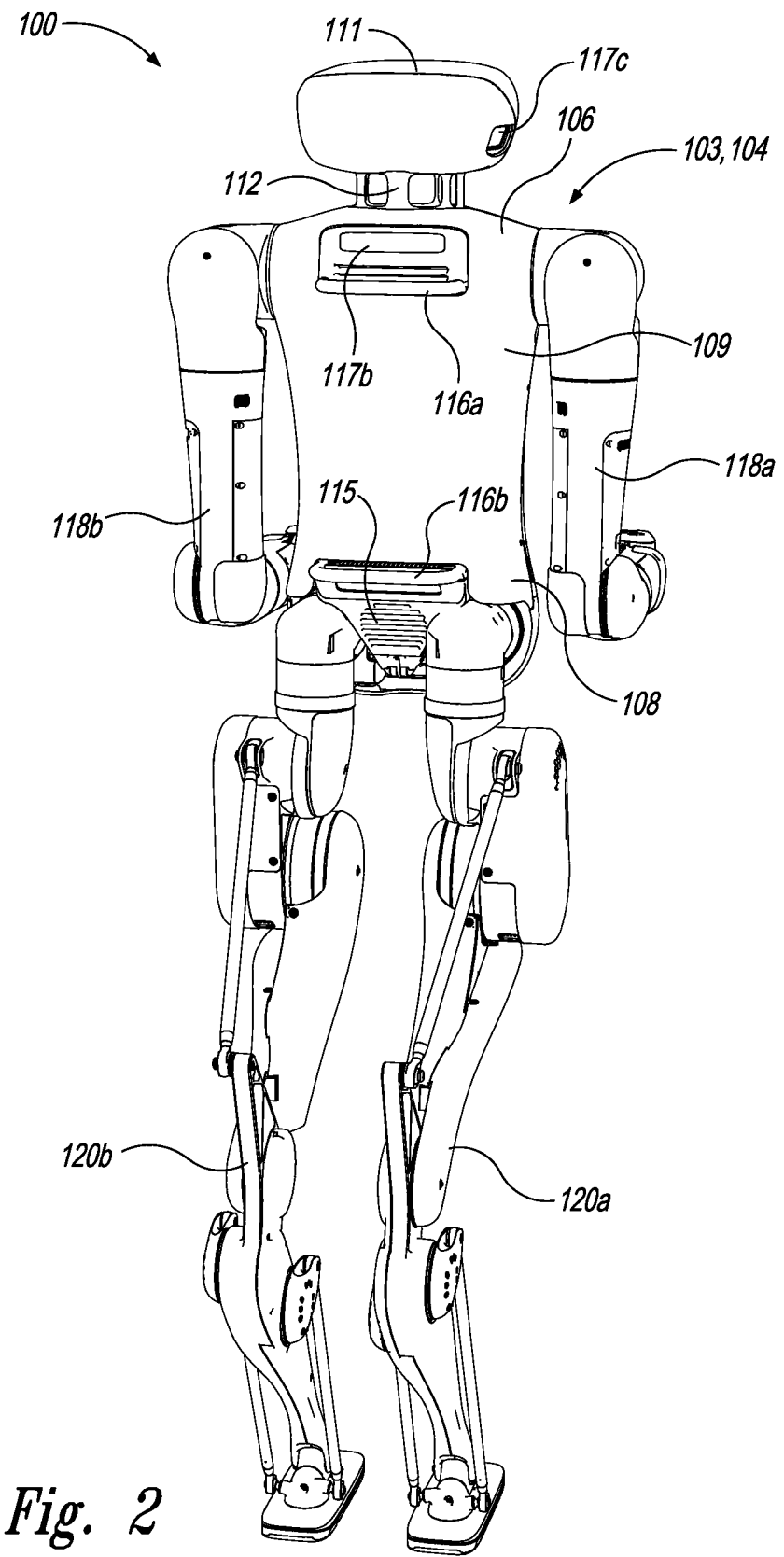
Figure 3:
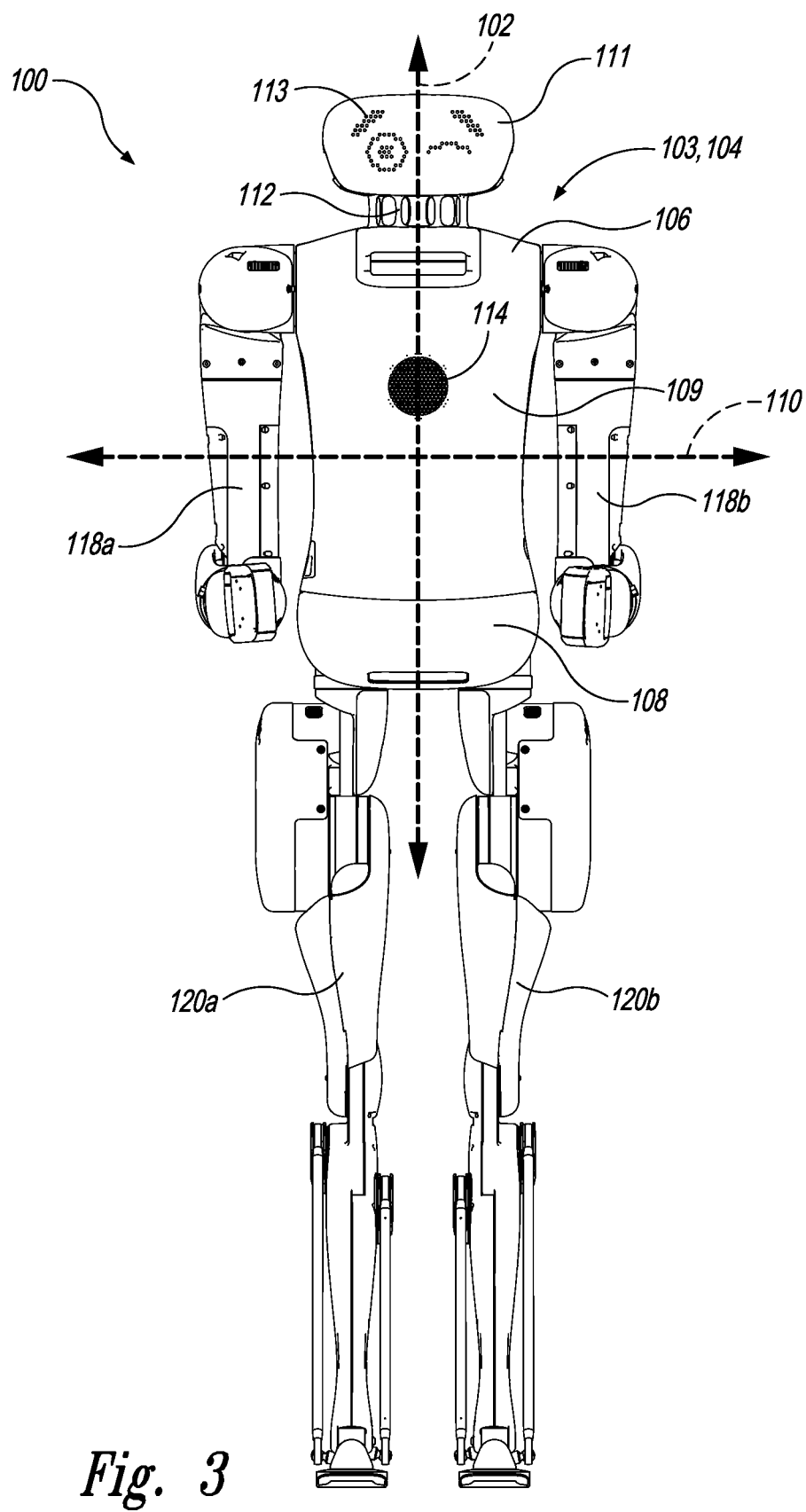
FIG. 3 is a front profile view of the robot in the first state shown in FIG. 1.
Figure 4:
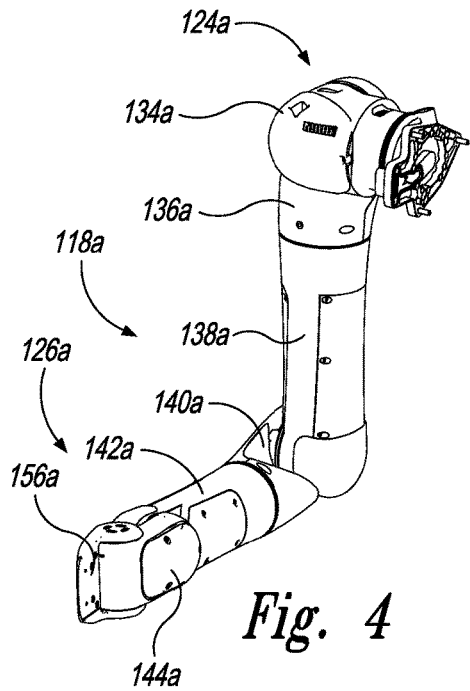
FIGS. 4-7 are perspective views of a first arm, a second arm, a first leg, and a second leg, respectively, of the robot shown in FIG. 1.
Figure 5:
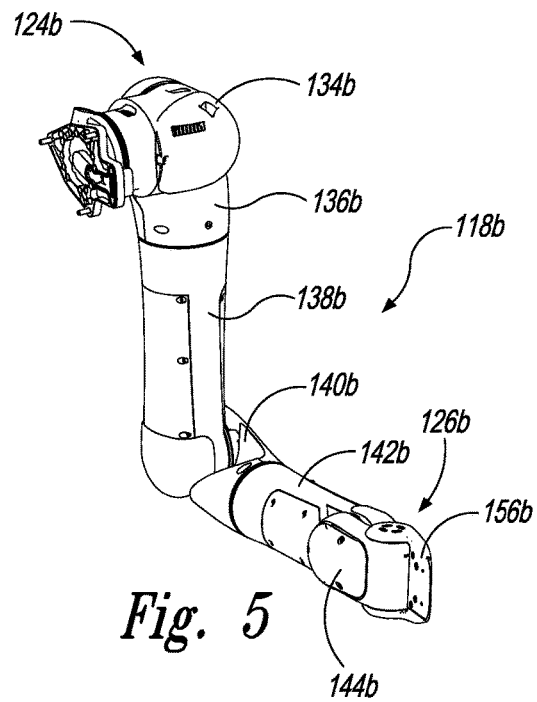
Figure 6:
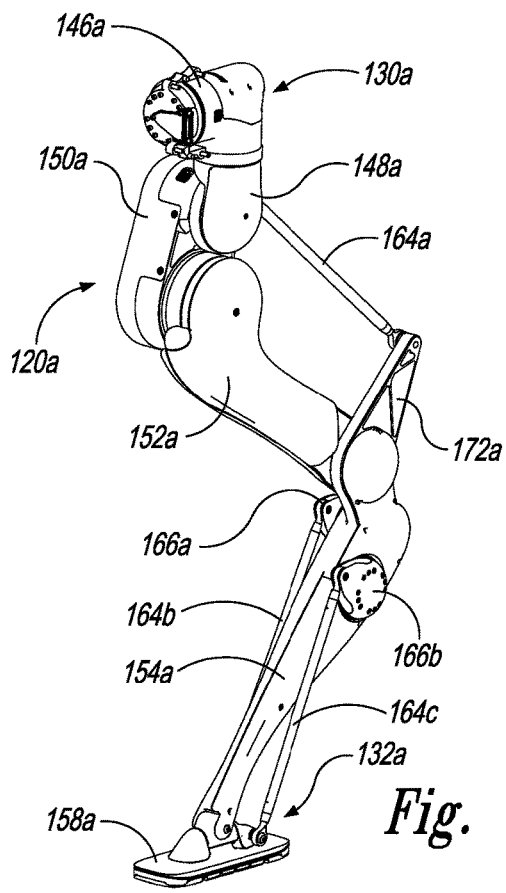
Figure 7:
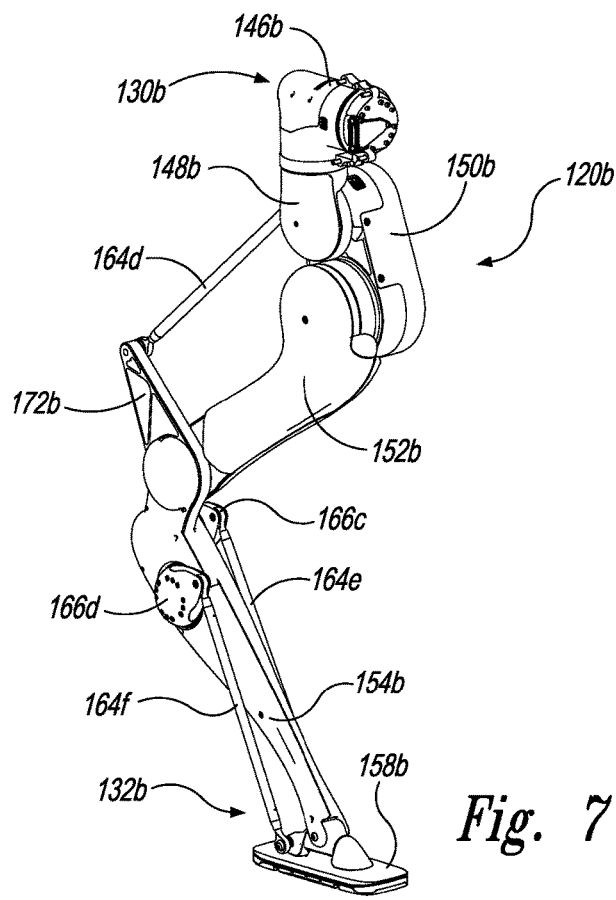
Figure 8:
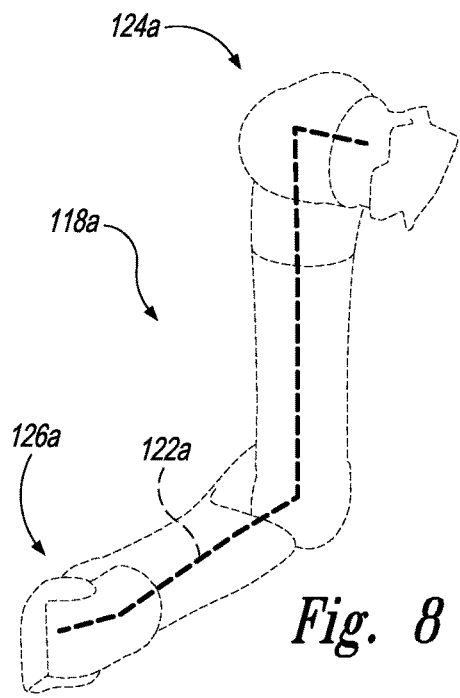
FIGS. 8-11 are silhouette views of the first arm, the second arm, the first leg, and the second leg of the robot shown in FIG. 1.
Figure 9:
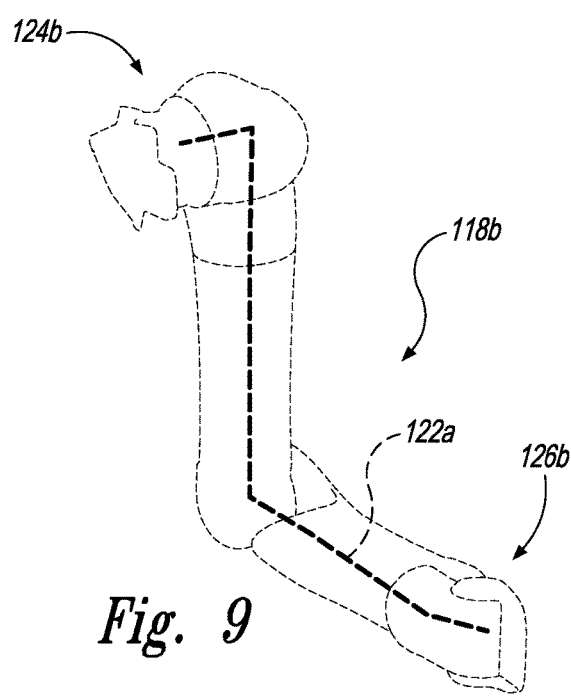
Figure 10:
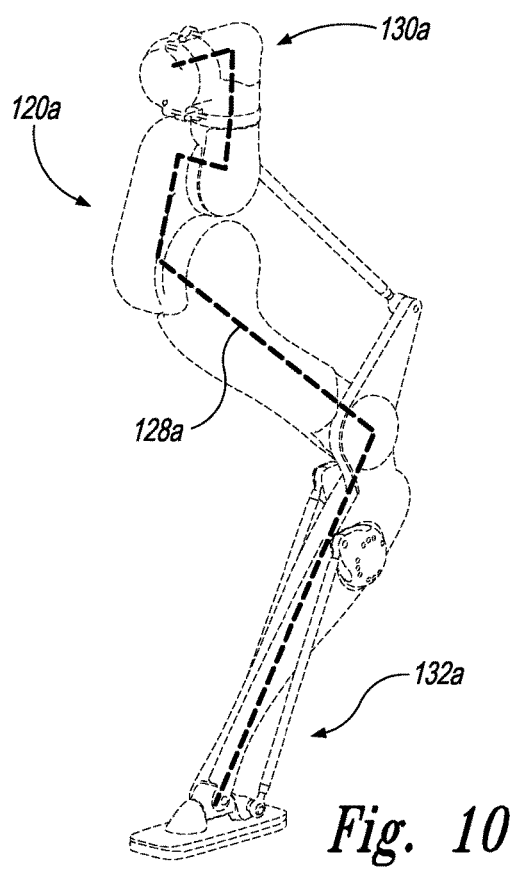
Figure 11:
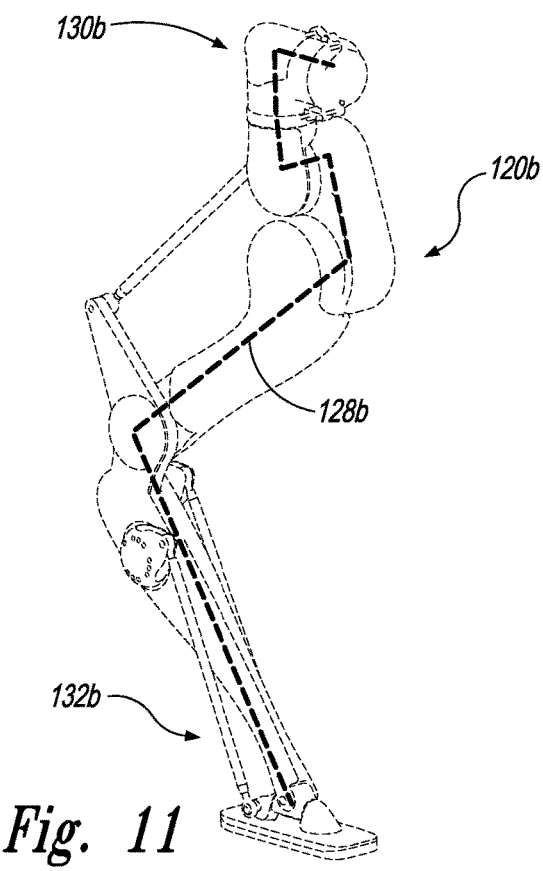

FIGS. 1 and 2 are different perspective views of a robot 100 in accordance with at least some embodiments of the present technology. FIG. 3 is a front profile view of the robot 100. As shown in FIGS. 1-3, the robot 100 can have a humanoid form. The robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113 including light-emitting diodes selectively controllable to create a composite, pixelated image evocative of human facial expression. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104. The robot 100 can still further include sensor arrays 117 (individually identified as sensor arrays 117a-117d) carried by the torso 104 and the head 111. The sensor arrays 117a, 117b can be at the superior portion 106 of the torso 104 and anteriorly and posteriorly directed, respectively. The sensor arrays 117c, 117d can be at opposite respective sides of the head 111 and can be directed in opposite respective lateral directions.

The robot 100 can further include articulated appendages carried by the torso 104. Among these articulated appendages, the robot 100 can include arms 118a, 118b and legs 120a, 120b. In at least some cases, the robot 100 is configured to manipulate objects via the arms 118a, 118b, such as bimanually. In these and other cases, the robot 100 can be configured to ambulate via the legs 120a, 120b, such as bipedally. FIGS. 4-15 show selected features of the arms 118a, 118b and legs 120a, 120b in greater detail. In particular, FIGS. 4-7 are perspective views of the arms 118a, 118b and legs 120a, 120b, respectively. FIGS. 8-11 are silhouette views of the arms 118a, 118b and legs 120a, 120b, respectively. Finally, FIGS. 12-15 are partially schematic diagrams showing kinematic chains corresponding to the arms 118a, 118b and legs 120a, 120b, respectively. In FIGS. 12-15, lines represent links, filled circles represent active joints, and open circles represent inactive joints.

With reference to FIGS. 1-15 together, the arms 118a, 118b can define respective arm lengths 122a, 122b extending from the torso 104. For clarity of illustration, the arm lengths 122a, 122b are only indicated in FIGS. 8 and 9, respectively. The arms 118a, 118b can have respective proximal end portions 124a, 124b and respective distal end portions 126a, 126b at opposite ends of the respective arm lengths 122a, 122b. The arms 118a, 118b can be connected to the torso 104 via the respective proximal end portions 124a, 124b thereof and the superior portion 106 of the torso 104. Similar to the arms 118a, 118b, the legs 120a, 120b can define respective leg lengths 128a, 128b extending from the torso 104. For clarity of illustration, the leg lengths 128a, 128b are only indicated in FIGS. 10 and 11, respectively. The legs 120a, 120b can have respective proximal end portions 130a, 130b and respective distal end portions 132a, 132b at opposite ends of the respective leg lengths 128a, 128b. The legs 120a, 120b can be connected to the torso 104 via the respective proximal end portions 130a, 130b thereof and the inferior portion 108 of the torso 104.

The arms 118a, 118b and the legs 120a, 120b can define kinematic chains. In at least some cases, the kinematic chains corresponding to the arms 118a, 118b provide at least five degrees of freedom, such as exactly five or exactly six degrees of freedom. In these and other cases, the kinematic chains corresponding to the legs 120a, 120b can provide at least four degrees of freedom, such as exactly four, exactly five, or exactly six degrees of freedom. The robot 100 can include links at progressively more distal (i.e., lower) levels within the kinematic chains corresponding to the arms 118a, 118b and the legs 120a, 120b and at progressively more distal (i.e., farther) positions along the arm lengths 122a, 122b and the leg lengths 128a, 128b. As parts of the arms 118a, 118b, the robot 100 can include proximal shoulder links 134a, 134b, distal shoulder links 136a, 136b, upper arm links 138a, 138b, elbow links 140a, 140b, lower arm links 142a, 142b, and wrist links 144a, 144b. Similarly, as parts of the legs 120a, 120b, the robot 100 can include proximal hip links 146a, 146b, distal hip links 148a, 148b, proximal thigh links 150a, 150b, distal thigh links 152a, 152b, and calf links 154a, 154b.

As further parts of the arms 118a, 118b, the robot 100 can include end effectors 156a, 156b opposite to the proximal end portions 124a, 124b along the arm lengths 122a, 122b and distal to the wrist links 144a, 144b. As further parts of the legs 120a, 120b, the robot 100 can include feet 158a, 158b opposite to the proximal end portions 130a, 130b along the leg lengths 128a, 128b and distal to the calf links 154a, 154b. The end effectors 156a, 156b can be at distalmost positions along the arm lengths 122a, 122b. Similarly, the feet 158a, 158b can be at distalmost positions along the leg lengths 128a, 128b. In the illustrated embodiment, the end effectors 156a, 156b and the feet 158a, 158b are not articulated. In other embodiments, counterparts of some or all of the end effectors 156a, 156b and the feet 158a, 158b can be articulated, such as with one or more movable fingers or toes.

With reference again to FIGS. 1-15, the robot 100 can include arm joints 160 (individually identified as arm joints 160a-160n) as parts of the arms 118a, 118b. The arm joints 160a-160n can be disposed between neighboring links within the kinematic chains corresponding to the arms 118a, 118b and at opposite ends of these kinematic chains. For clarity of illustration, the arm joints 160 are only indicated in FIGS. 12 and 13. The robot 100 can further include leg joints 162 (individually identified as leg joints 162a-162l) as parts of the legs 120a, 120b. Similar to the arm joints 160a-160n, the leg joints 162a-162l can be disposed between neighboring links within the kinematic chains corresponding to the legs 120a, 120b and at opposite ends of these kinematic chains. For clarity of illustration, the leg joints 162 are only indicated in FIGS. 14 and 15. The arm joints 160a-160n and the leg joints 162a-162l may be referenced herein in connection with the distally neighboring link along the kinematic chain of the corresponding one of the arms 118a, 118b and the legs 120a, 120b. For example, the arm joints 160f, 160m may be referenced herein as the wrist joints 160f, 160m.

In FIGS. 1-3, the robot 100 is shown in a first state, which can correspond to a home pose, a neutral pose, etc. well-suited to an object handling task. In the first state, the proximal shoulder links 134a, 134b can extend laterally from the torso 104. Also, in the first state, the distal shoulder links 136a, 136b and the upper arm links 138a, 138b can extend inferiorly from the proximal shoulder links 134a, 134b. Also, in the first state, the elbow links 140a, 140b, the lower arm links 142a, 142b, and the wrist links 144a, 144b can extend anteriorly from the upper arm links 138a, 138b. Also, in the first state, the proximal hip links 146a, 146b can extend posteriorly from the torso 104. Also, in the first state, the distal hip links 148a, 148b and the proximal thigh links 150a, 150b can extend inferiorly from the proximal hip links 146a, 146b. Also, in the first state, the distal thigh links 152a, 152b can extend inferiorly and posteriorly from the proximal thigh links 150a, 150b. Finally, in the first state, the calf links 154a, 154b can extend inferiorly and anteriorly from the distal thigh links 152a, 152b.

In at least some cases, the calf joints 162e, 162k and the foot joints 162f, 162l are passive. As additional parts of the legs 120a, 120b, the robot 100 can include connection shafts 164 (individually identified as connection shafts 164a-164f), cranks 166 (individually identified as cranks 166a-166d), ancillary active joints 168 (individually identified as ancillary active joints 168a-168d), and ancillary passive joints 170 (individually identified as ancillary passive joints 170a-170l). The connection shafts 164a, 164d can extend between the proximal thigh links 150a, 150b and the calf links 154a, 154b. When the robot 100 is in the first state, the connection shafts 164a, 164d can be posteriorly spaced apart from the distal thigh links 152a, 152b and within 10 degrees of parallel to (e.g., within 5 degrees of parallel to and/or substantially parallel to) corresponding portions of the leg lengths 128a, 128b. Moving the distal thigh joints 162d, 162j from their positions when the robot 100 is in the first state can cause the connection shafts 164a, 164d to move increasingly off parallel from the corresponding portions of the leg lengths 128a, 128b.

The calf links 154a, 154b can include projections 172a, 172b extending posteriorly and superiorly from the calf joints 162e, 162k. The ancillary passive joints 170a, 170b can be at opposite ends of the connection shaft 164a. Similarly, the ancillary passive joints 170g, 170h can be at opposite ends of the connection shaft 164d. Due to their kinematic arrangement, an actuated position of the distal thigh joint 162d can dictate positions of the calf joint 162e and of the ancillary passive joints 170a, 170b. Similarly, due to their kinematic arrangement, an actuated position of the distal thigh joint 162j can dictate positions of the calf joint 162k and of the ancillary passive joints 170g, 170h. The calf links 154a, 155b can carry the cranks 166a, 166c laterally. The calf links 154a, 155b can further carry the cranks 166b, 166d medially. The ancillary active joints 168a, 168b can be between the cranks 166a, 166b and the calf link 154a. Similarly, the ancillary active joints 168c, 168d can be between the cranks 166c, 166d and the calf link 154b.

The connection shafts 164b, 164c can extend between the cranks 166a, 166b and the foot 158a and can be spaced apart laterally and medially, respectively, from the calf link 154a. Similarly, the connection shafts 164e, 164f can extend between the cranks 166c, 166d and the foot 158b and can be spaced apart laterally and medially, respectively, from the calf link 154b. The ancillary passive joints 170c, 170e can be at opposite ends of the connection shaft 164b. The ancillary passive joints 170d, 170f can be at opposite ends of the connection shaft 164c. The ancillary passive joints 170i, 170k can be at opposite ends of the connection shaft 164e. Finally, the ancillary passive joints 170j, 170l can be at opposite ends of the connection shaft 164f. The ancillary active joints 168a, 168b can be configured to operate in concert with one another to move the foot 158a relative to the calf link 154a. Due to their kinematic arrangement, actuated positions of the ancillary active joints 168a, 168b can dictate positions of the foot joint 162f and of the ancillary passive joints 170c-170f. Similarly, the ancillary active joints 168c, 168d can be configured to operate in concert with one another to move the foot 158b relative to the calf link 154b. Due to their kinematic arrangement, actuated positions of the ancillary active joints 168c, 168d can dictate positions of the foot joint 162l and of the ancillary passive joints 170i-170l.

The relative orientations of the arm joints 160a-160l, the relative positions of the arm joints 160a-160l, the dimensions of the links within the kinematic chains corresponding to the arms 118a, 118b, the shapes of these links, and/or other features of the arms 118a, 118b can provide advantages over conventional alternatives. Examples of these advantages include enhanced maneuverability, enhanced range of motion, enhanced economy of motion, reduced occurrence of kinematic singularities during certain operations (e.g., object lifting, object carrying, etc.), closer emulation of human arm kinematics, and closer emulation of human arm conformation, among others. Furthermore, the relative orientations of the leg joints 162a-162l, the relative positions of the leg joints 162a-162l, the dimensions of the links within the kinematic chains corresponding to the legs 120a, 120b, the shapes of these links, and/or other features of the legs 120a, 120b can provide advantages over conventional alternatives. Examples of these advantages include enhanced maneuverability, enhanced range of motion, enhanced economy of motion, reduced occurrence of kinematic singularities during certain operations (e.g., walking, running, etc.), closer emulation of human leg kinematics, and closer emulation of human leg conformation, among others.

Figures 16, 17:
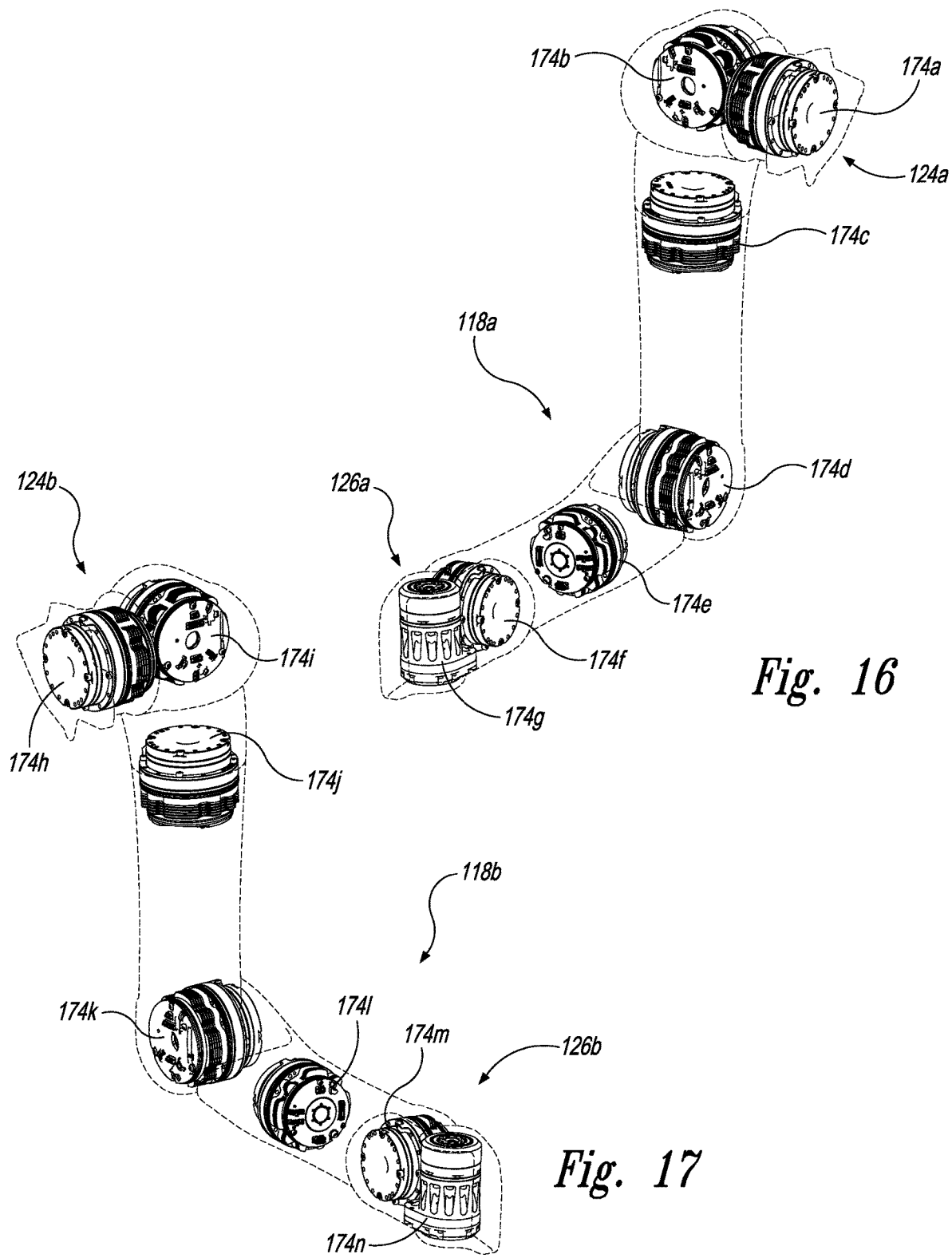
Figure 21:
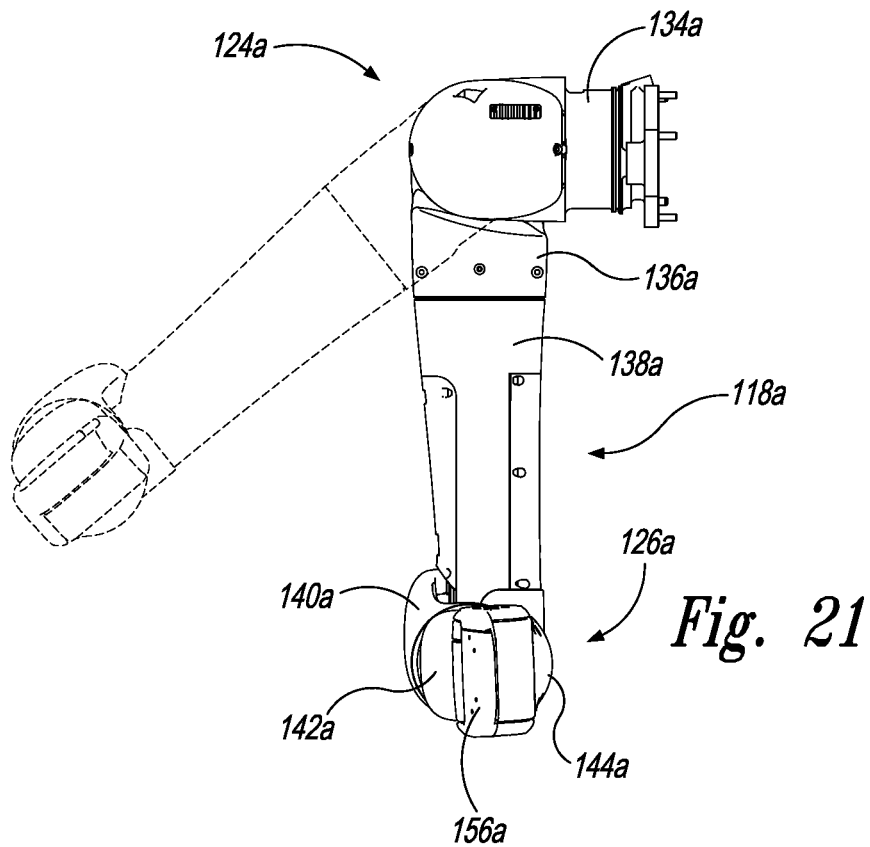
FIG. 21 is a front profile view of the first arm of the robot shown in FIG. 1 indicating isolated motion about an arm joint of the robot distal to the arm joint of FIG. 20 along the kinematic chain of FIG. 12.
Figure 22:
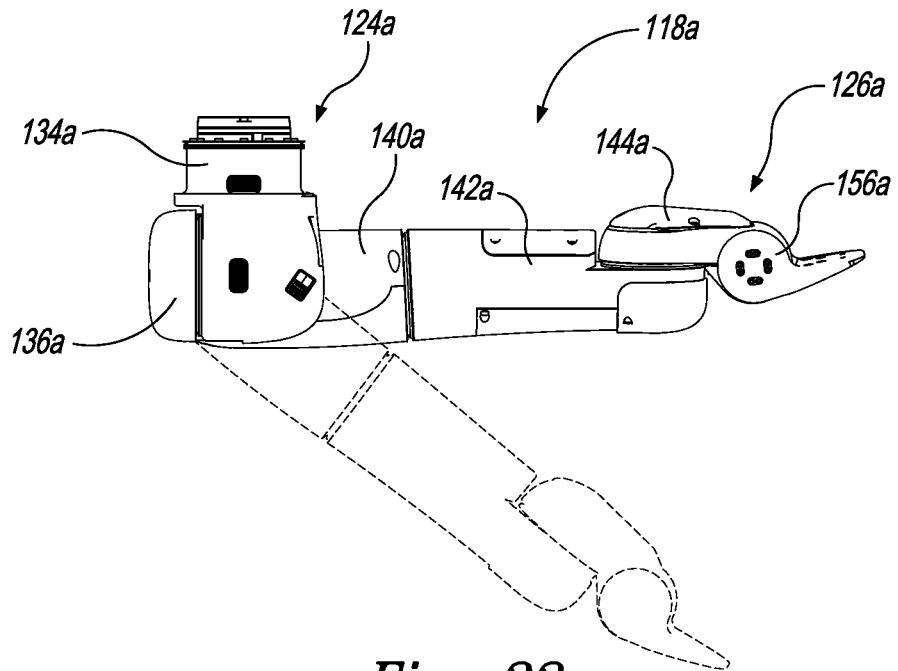
FIG. 22 is a top plan view of the first arm of the robot shown in FIG. 1 indicating isolated motion about an arm joint of the robot distal to the arm joint of FIG. 21 along the kinematic chain of FIG. 12.
Figure 23:
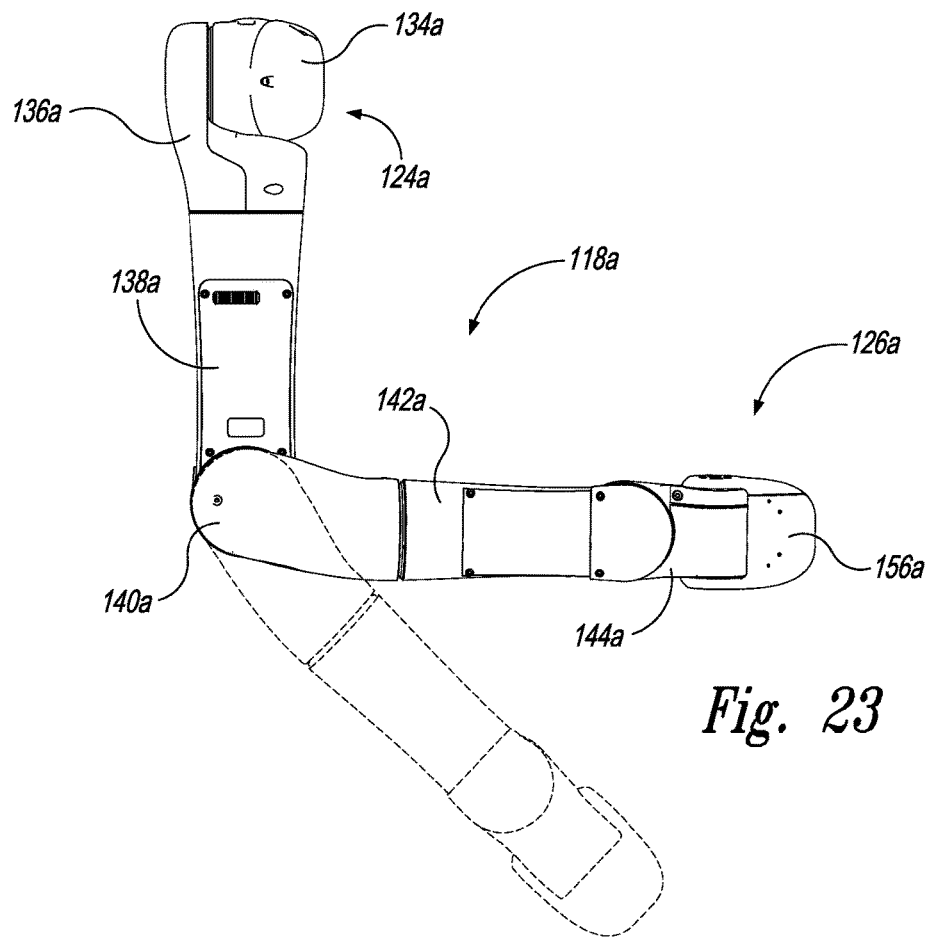
FIG. 23 is a side profile view of the first arm of the robot shown in FIG. 1 indicating isolated motion about an arm joint of the robot distal to the arm joint of FIG. 22 along the kinematic chain of FIG. 12.

FIGS. 16 and 17 are partially transparent perspective views of the arms 118a, 118b, respectively. As shown in FIGS. 16 and 17, the robot 100 can include arm actuators 174 (individually identified as arm actuators 174a-174n) as parts of the arms 118a, 118b. The arm actuators 174a-174n can be embedded within, mounted to, or otherwise carried by the links within the kinematic chains corresponding to the arms 118a, 118b. In the illustrated embodiment, the arm actuators 174a-174n are incorporated into the arms 118a, 118b in the following manner. The arm actuators 174a, 174h are embedded within portions of the proximal shoulder links 134a, 134b at the proximal shoulder joints 160a, 160h. The arm actuators 174b, 174i are embedded within portions of the proximal shoulder links 134a, 134b at the distal shoulder joints 160b, 160i. The arm actuators 174c, 174j are embedded within portions of the upper arm links 138a, 138b at the upper arm joints 160c, 160j. The arm actuators 174d, 174k are embedded within portions of the upper arm links 138a, 138b at the elbow joints 160d, 160k. The arm actuators 174e, 174l are embedded within portions of the lower arm links 142a, 142b at the lower arm joints 160e, 160l. The arm actuators 174f, 174m are embedded within portions of the lower arm links 142a, 142b at the wrist joints 160f, 160m. Finally, the arm actuators 174g, 174n are embedded within portions of the wrist links 144a, 144b at the end effector joints 160g, 160n.

FIGS. 18 and 19 are partially transparent perspective views of the legs 120a, 120b, respectively. As shown in FIGS. 18 and 19, the robot 100 can include leg actuators 176 (individually identified as leg actuators 176a-176g) as parts of the legs 120a, 120b. The leg actuators 176a-176g can be embedded within, mounted to, or otherwise carried by the links within the kinematic chains corresponding to the legs 120a, 120b. In the illustrated embodiment, the leg actuators 176a-176g are incorporated into the legs 120a, 120b in the following manner. The leg actuators 176a, 176g are embedded within portions of the proximal hip links 146a, 146b at the proximal hip joints 162a, 162g. The leg actuators 176b, 176h are embedded within portions of the proximal hip links 146a, 146b at the distal hip joints 162b, 162h. The leg actuators 176c, 176i are embedded within portions of the proximal thigh links 150a, 150b at the proximal thigh joints 162c, 162i. The leg actuators 176d, 176j are embedded within portions of the proximal thigh links 150a, 150b at the distal thigh joints 162d, 162j. The leg actuators 176e, 176k are embedded within portions of the calf links 154a, 154b spaced apart from the foot joints 162f, 162l along the corresponding leg lengths 128a, 128b and are operably connected to the foot joints 162f, 162l via the cranks 166a, 166c and the connection shafts 164a, 164c. Finally, the leg actuators 176f, 176l are embedded within portions of the calf links 154a, 154b spaced apart from the foot joints 162f, 162l and distal to the leg actuators 176e, 176k along the corresponding leg lengths 128a, 128b and are operably connected to the foot joints 162f, 162l via the cranks 166b, 166d and the connection shafts 164b, 164d.

In at least some cases, the arm actuators 174a-174n and the leg actuators 176a-176g are rotary actuators including electric servo motors and corresponding harmonic gear units. This combination can be characterized by relatively high torque density, compact size, high efficiency, and low backlash, among other potentially advantageous features. Suitable actuators include those available from Harmonic Drive LLC (Beverly, Mass.). In other cases, counterparts of some or all of the arm actuators 174 and the leg actuators 176 can be pneumatic or hydraulic rather than electric, be linear rather than rotary, be stepper-type rather than servo-type, be direct drive rather than geared, and/or have different gearing than in the illustrated embodiment (e.g., cycloidal, spur, helical, miter, worm, rack, bevel, screw, etc.).

Figure 24:
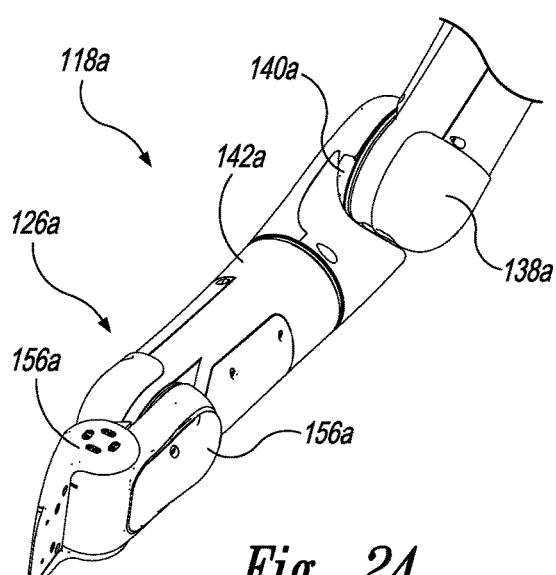
FIGS. 24 and 25 are perspective views of a portion of the first arm of the robot shown in FIG. 1 indicating isolated motion about an arm joint of the robot distal to the arm joint of FIG. 23 along the kinematic chain of FIG. 12.
Figure 25:
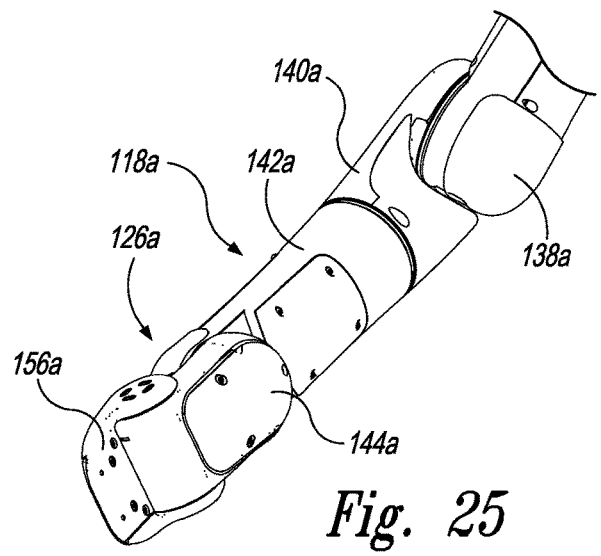
Figure 26:
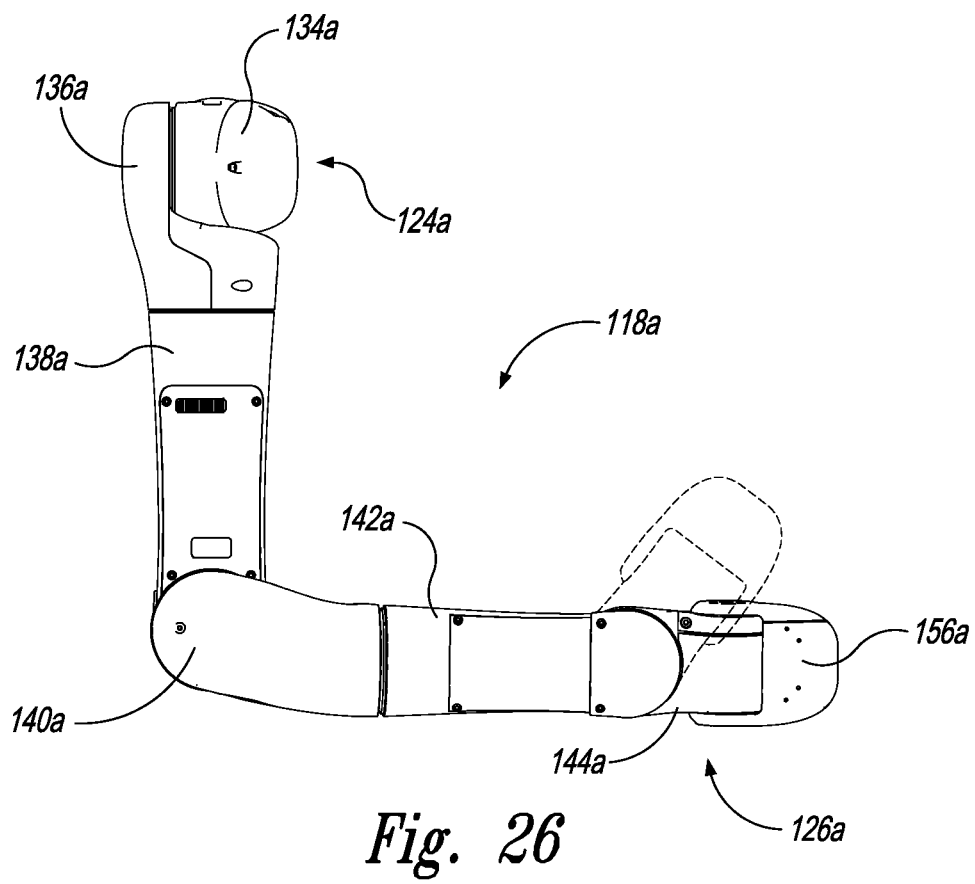
FIG. 26 is a side profile view of the first arm of the robot shown in FIG. 1 indicating isolated motion about an arm joint of the robot distal to the arm joint of FIGS. 24 and 25 along the kinematic chain of FIG. 12.
Figure 27:
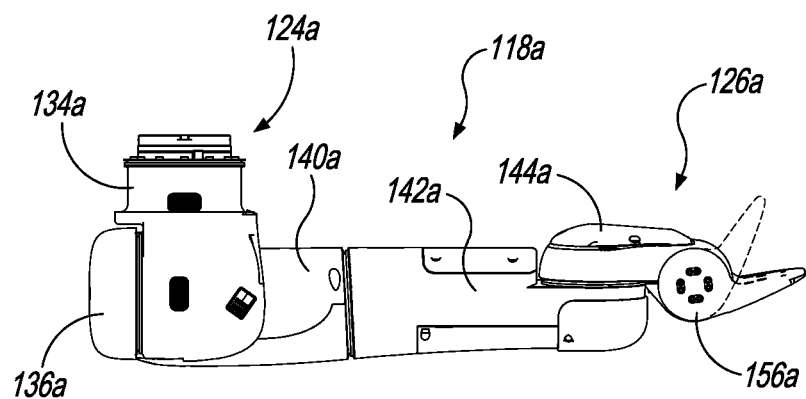
FIG. 27 is a top plan view of the first arm of the robot shown in FIG. 1 indicating isolated motion about an arm joint of the robot distal to the arm joint of FIG. 26 along the kinematic chain of FIG. 12.

FIGS. 20-23 are various views of the arm 118a indicating isolated motion about the proximal shoulder joint 160a, the distal shoulder joint 160b, the upper arm joint 160c, and the elbow joint 160d, respectively. FIGS. 24 and 25 are perspective views of a portion of the arm 118a indicating isolated motion about the lower arm joint 160e. FIGS. 26 and 27 are a side profile view and a top plan view, respectively, of the arm 118a indicating isolated motion about the wrist joint 160f and the end effector joint 160g, respectively. Motion about the arm joints 160h-160n of the arm 118b can correspond symmetrically about the midsagittal plane 102 (FIG. 3) to the motion about the arm joints 160a-160g of the arm 118a shown in FIGS. 20-27. In at least some cases, the proximal shoulder joints 160a, 160h, the upper arm joints 160c, 160j, and the lower arm joints 160e, 160l are configured to rotate about respective axes parallel to the corresponding arm lengths 122a, 122b. In these and other cases, the distal shoulder joints 160b, 160i, the elbow joints 160d, 160k, the wrist joints 160f, 160m, and the end effector joints 160g, 160n can be configured to rotate about respective axes off-parallel to (e.g., within 10 degrees of perpendicular to, within 5 degrees of perpendicular to and/or substantially perpendicular to) the corresponding arm lengths 122a, 122b.

Figure 28:
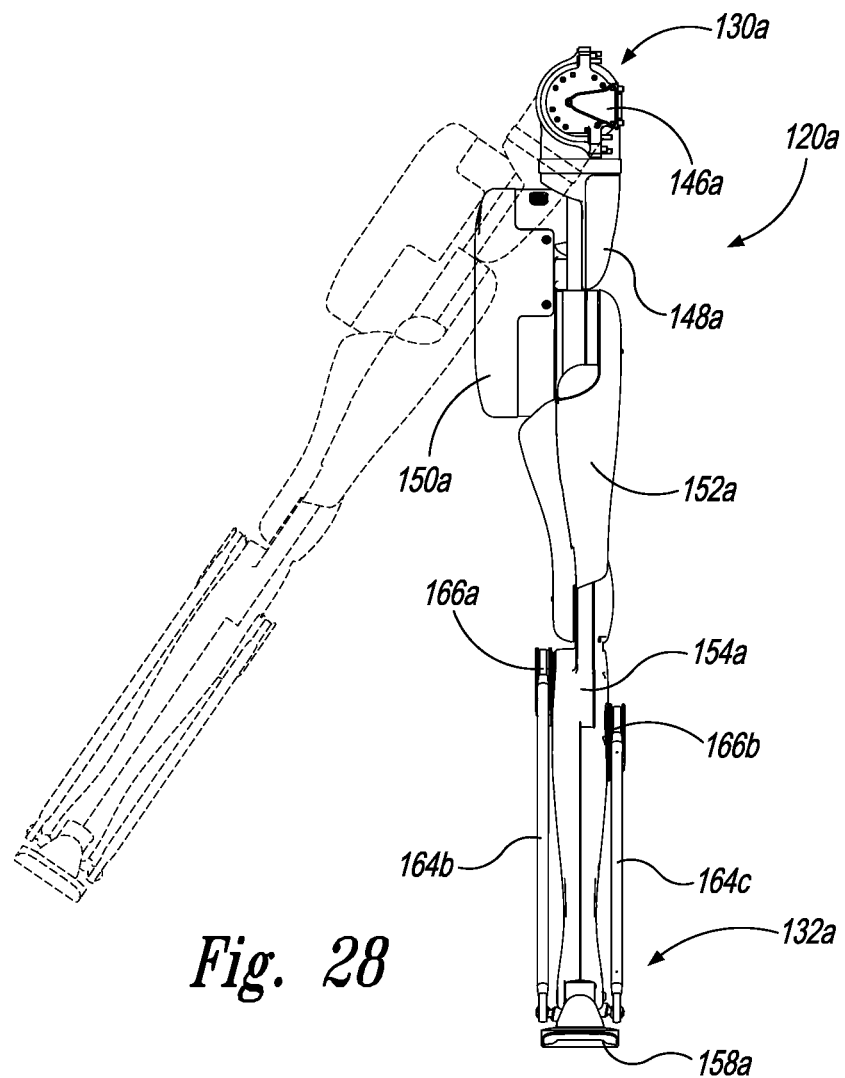
FIG. 28 is a front profile view of the first leg of the robot shown in FIG. 1 indicating isolated motion about a leg joint of the robot along the kinematic chain of FIG. 14.
Figure 29:
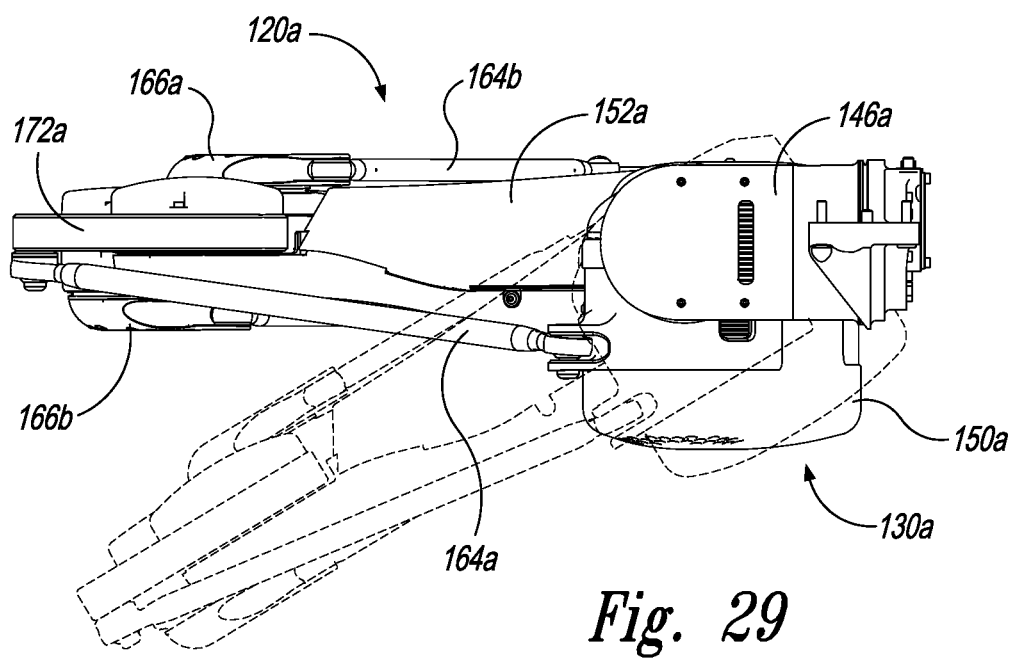
FIG. 29 is a top plan view of the first leg of the robot shown in FIG. 1 indicating isolated motion about a leg joint of the robot distal to the leg joint of FIG. 28 along the kinematic chain of FIG. 14.
Figure 30:
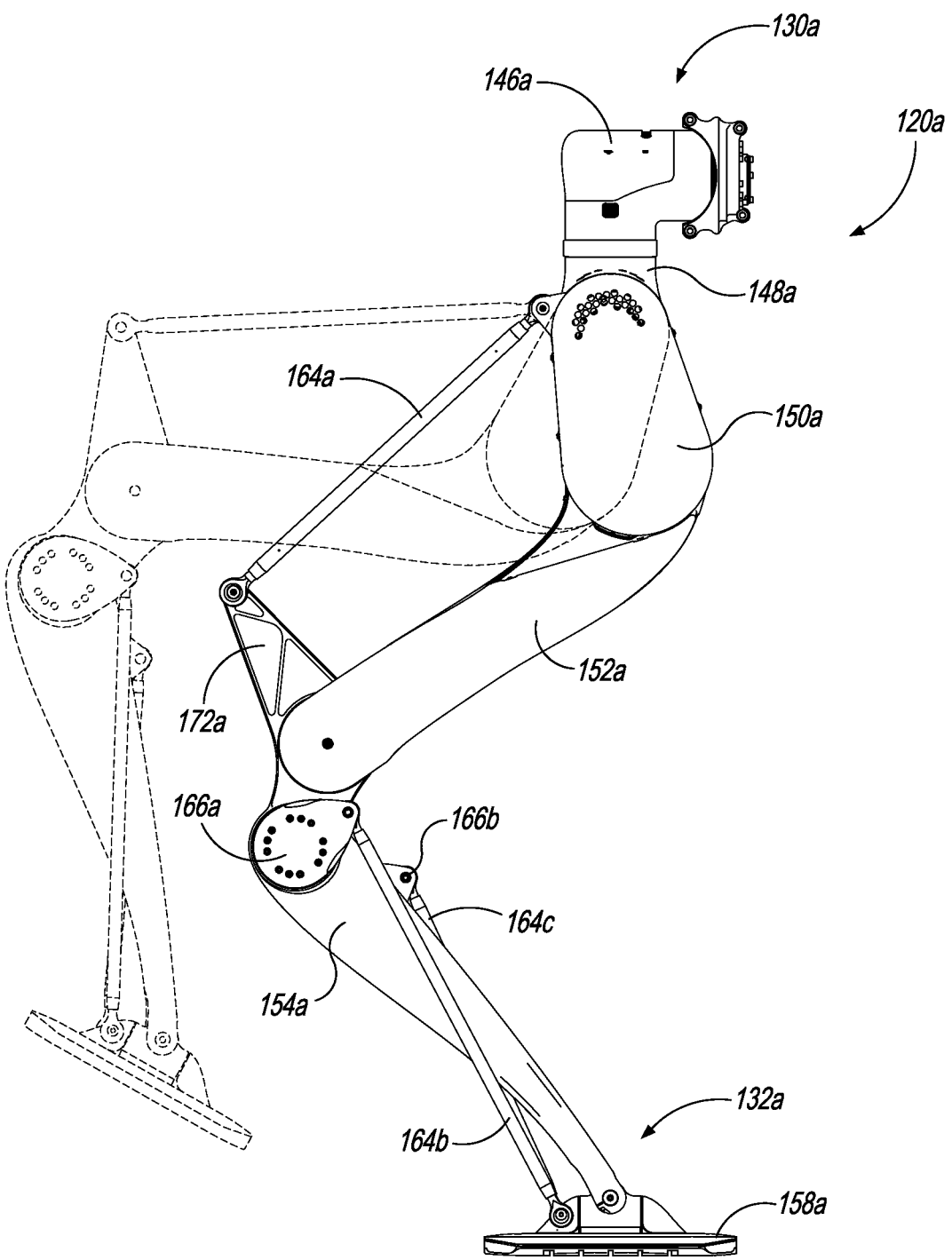
FIG. 30 is a side profile view of the first leg of the robot shown in FIG. 1 indicating isolated motion about a leg joint of the robot distal to the leg joint of FIG. 29 along the kinematic chain of FIG. 14.
Figure 31:
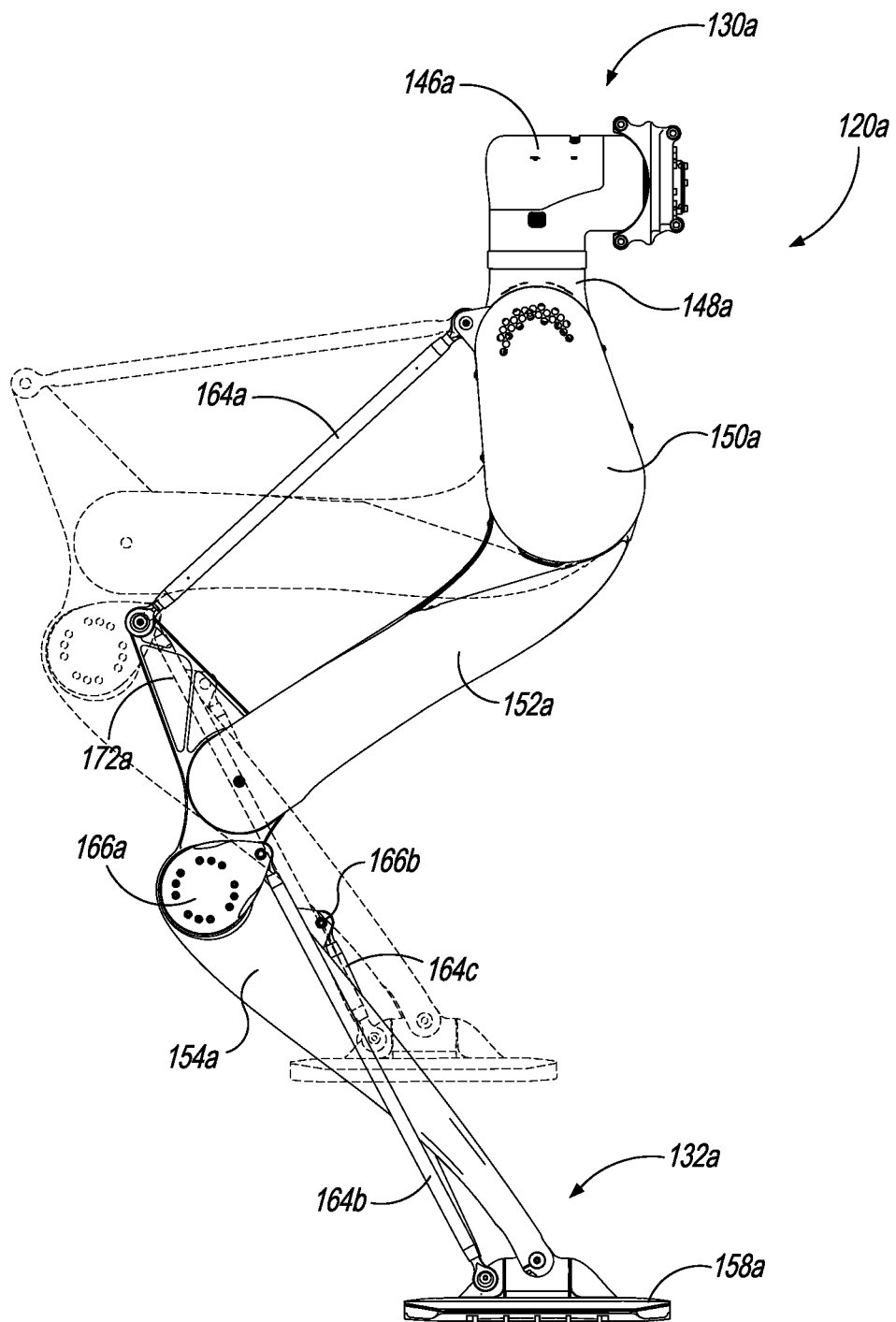
FIG. 31 is a side profile view of the first leg of the robot shown in FIG. 1 indicating isolated motion about two leg joints of the robot distal to the leg joint of FIG. 30 along the kinematic chain of FIG. 14.
Figure 32:
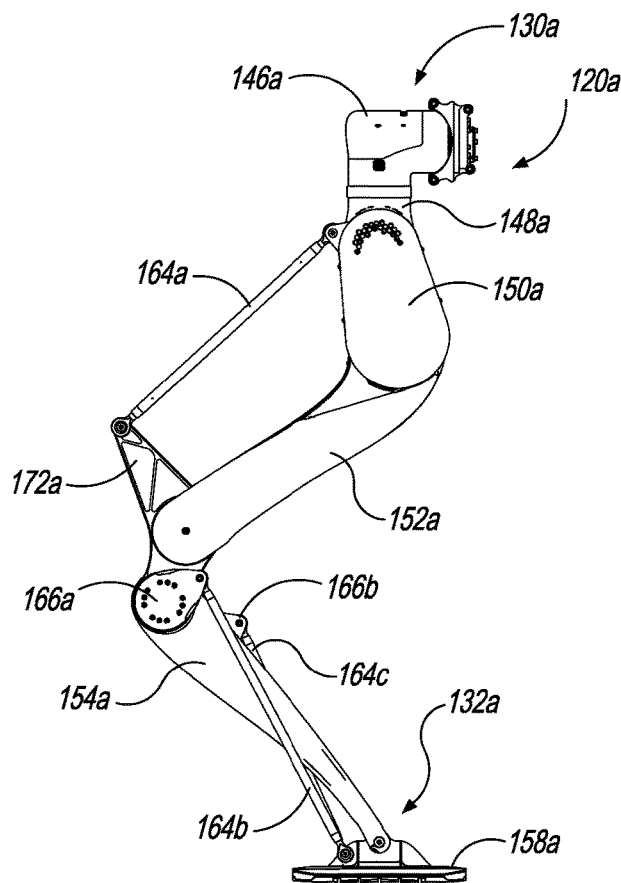
FIGS. 32 and 33 are side profile views of the first leg of the robot shown in FIG. 1 indicating isolated motion about a leg joint of the robot distal to the leg joints of FIG. 31 along the kinematic chain of FIG. 14.
Figure 33:
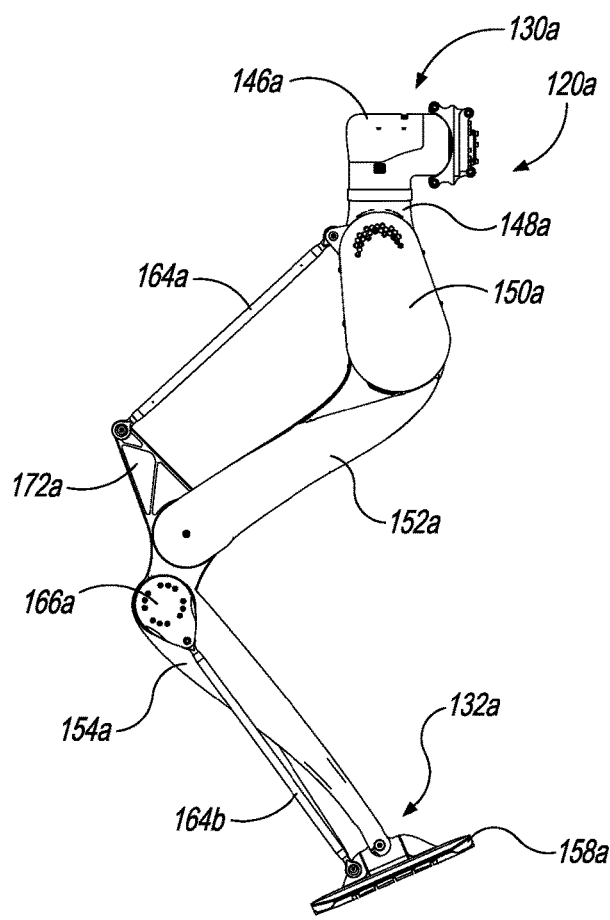

FIGS. 28-30 are various views of the leg 120a indicating isolated motion about the proximal hip joint 162a, the distal hip joint 162b, and the proximal thigh joint 162c, respectively. FIG. 31 is a side profile view of the leg 120a indicating isolated motion about both the distal thigh joint 162d and the calf joint 162e. FIGS. 32 and 33 are side profile views of the leg 120a indicating isolated motion about the foot joint 162f. Motion about the leg joints 162g-162l of the leg 120b can correspond symmetrically about the midsagittal plane 102 (FIG. 3) to the motion about the leg joints 162a-160f of the leg 120a shown in FIGS. 28-33. In at least some cases, the proximal hip joints 162a, 162g and the distal hip joints 162b, 162h are configured to rotate about respective axes parallel to the corresponding leg lengths 128a, 128b. In these and other cases, proximal thigh joints 162c, 162i, the distal thigh joints 162d, 162j, the calf joints 162e, 162k, and the foot joints 162f, 162l can be configured to rotate about respective axes off-parallel to (e.g., within 10 degrees of perpendicular to, within 5 degrees of perpendicular to and/or substantially perpendicular to) the corresponding leg lengths 128a, 128b.

Electrical and Computer Systems

Figure 34:
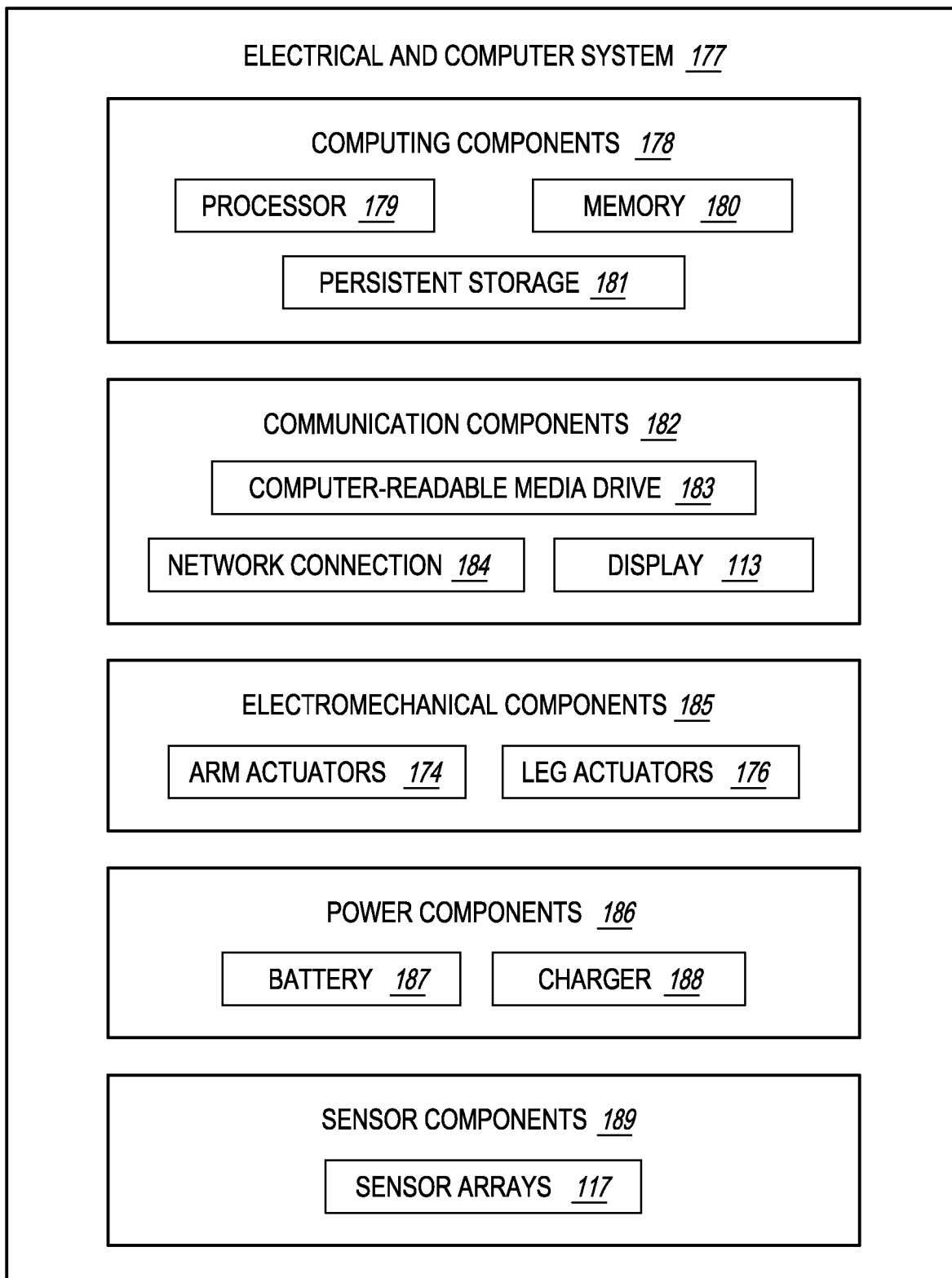
FIG. 34 is a block diagram illustrating an electrical and computer system of the robot shown in FIG. 1.

FIG. 34 is a block diagram illustrating an electrical and computer system 177 of the robot 100. When suitable, operations described elsewhere in this disclosure (e.g., movements of the robot 100) can be implemented via this electrical and computer system 177 autonomously and/or in response to instructions from a user. As shown in FIG. 34, the electrical and computer system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the electrical and computer system 177.

The electrical and computer system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH, WiFi, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The electrical and computer system 177 can further include electromechanical components 185. The electromechanical components 185 can include the arm actuators 174 and the leg actuators 176 discussed above and/or other suitable components for implementing mechanical action within the robot 100. The electrical and computer system 177 can further include power components 186. The power components 186 can include a battery 187 and a charger 188. The battery 187 can be a lithium-ion battery, a lead-acid battery, or another suitable type. The charger 188 can include a connector (not shown) compatible with a power source (e.g., a wall outlet) and leads (also not shown) extending between the connector and the battery 187.

Finally, the electrical and computer system 177 can include sensor components 189 for capturing, providing, and/or analyzing information about the robot 100 itself and/or the environment in which the robot 100 is operating. The sensor components 189 can include the sensor arrays 117 discussed above. At the sensor arrays 117 or at one or more other suitable locations, the robot 100 can include among the sensor components 189 a light sensor (e.g., a photoresistor), a sound sensor (e.g., a microphone), an accelerometer, a gyroscope, a tilt sensor, a location sensor (e.g., using the Global Positioning System), a distance sensor, a contact sensor, and/or a proximity sensor, among other examples. The robot 100 can include one or more sensors in a sensor system, such as a vision system, a light detection and ranging (LIDAR) system, a sound navigation and ranging (SONAR) system, etc. In at least some cases, the robot 100 monitors itself and/or its environment in real-time or in near real-time. Moreover, the robot 100 may use acquired sensor data as a basis for decision-making via the computing components 178.

Components of the electrical and computer system 177 can be connected to one another and/or to other components of the robot 100 via suitable conductors, transmitters, receivers, circuitry, etc. While the electrical and computer system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the electrical and computer system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks or to implement particular abstract data types and may be encrypted. Furthermore, the functionality of the program modules may be combined or distributed as desired in various examples. Moreover, control scripts may be implemented in any suitable manner, such as in C/C++ or Python. The functionality of the program modules may be combined or distributed in various embodiments, including cloud-based implementations, web applications, mobile applications for mobile devices, etc.

Furthermore certain aspects of the present technology can be embodied in a special purpose computer or data processor, such as application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a Local Area Network (LAN), Wide Area Network (WAN), or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, biological memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave, etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques. Additionally, elements of the robot 100 may be distributed rather than located in a single monolithic entity. Accordingly, the disclosed systems and techniques may operate in one or more examples other than the examples provided above.

Grippers

FIGS. 35-39 are, respectively, a perspective view, a first side profile view, an opposite second side profile view, a front profile view, and a top plan view of a portion of the arm 118a. Features of the arm 118b can correspond symmetrically about the midsagittal plane 102 (FIG. 3) to the features of the arm 118a shown in FIGS. 35-39. Accordingly, the newly introduced features in FIGS. 35-39 will be assigned reference numbers appended with "a." Any corresponding features of the arm 118b will be assigned reference numbers appended with "b" in FIGS. 40-56 and the discussion of these figures below. With reference to FIGS. 1-39 together, the arm 118a can include a gripper 200a carried by the wrist link 144a. In at least some cases, the wrist link 144a is separated from the end effector 156a by one degree of freedom and is separated from the lower arm link 142a also by one degree of freedom. Through its location on the wrist link 144a or in another suitable manner, the gripper 200a can likewise be separated from the end effector 156a by one degree of freedom and from the lower arm link 142a also be one degree of freedom. The end effector joint 160g (FIG. 12) can be configured to rotate the end effector 156a relative to the gripper 200a about an end effector axis 202a. The wrist joint 160f (FIG. 12) can be configured to rotate the wrist link 144a and the gripper 200a relative to the lower arm link 142a about a wrist axis 204a within 10 degrees of perpendicular to (e.g., within 5 degrees of perpendicular to and/or substantially perpendicular to) the arm length 122a and within 10 degrees of perpendicular to (e.g., within 5 degrees of perpendicular to and/or substantially perpendicular to) the end effector axis 202a.

The wrist link 144a can include a frame 206a and the gripper 200a as components thereof. For example, the frame 206a and the gripper 200a can be separately formed and joined adhesively, mechanically (e.g., with fasteners), or in another suitable manner. The frame 206a can include an arcuate rim 208a at the wrist joint 160f, a cylindroid shell 210a at the end effector joint 160g, and a bridge 212a therebetween. The arcuate rim 208a can have a first side 214a within 10 degrees of perpendicular to (e.g., within 5 degrees of perpendicular to and/or substantially perpendicular to) the wrist axis 204a, a second side 216a within 10 degrees of parallel to (e.g., within 5 degrees of parallel to and/or substantially parallel to) and spaced apart from the first side 214a, and a rim surface 218a extending between the first side 214a and the second side 216a along a proximal perimeter of the wrist link 144a. The rim surface 218a can be rounded about the wrist axis 204a and tilted inwardly toward the gripper 200a. In at least some cases, the arcuate rim 208a at least partially encases a drive socket (not shown) or another type of internal connector through which force from the arm actuator 174f transfers to the wrist link 144a.

The bridge 212a can be prismatic in form and can include a first side 220a distally neighboring, within 10 degrees of parallel to (e.g., within 5 degrees of parallel to and/or substantially parallel to), and offset slightly medially relative to the first side 214a of the arcuate rim 208a. The bridge 212a can further include a second side 222a opposite to the first side 220a and extending laterally and distally from the arcuate rim 208a such that a thickness of the wrist link 144a perpendicular to the first side 220a of the bridge 212a increases distally at the bridge 212a. At a distalmost portion of the wrist link 144a, the cylindroid shell 210a can include a major surface 224a rounded about the end effector axis 202a. In at least some cases, the cylindroid shell 210a at least partially encases the arm actuator 174g.

The end effector 156a can include a paddle 226a defining a paddle thickness 228a and having a first major surface 230a and a second major surface 232a opposite to one another and spaced apart from one another along the paddle thickness 228a. The first major surface 230a can be within 10 degrees of parallel to (e.g., within 5 degrees of parallel to and/or substantially parallel to) the end effector axis 202a. The paddle 226a can further include a distal edge 234a with a rounded superior portion 236a, a rounded inferior portion 238a, and a straight intermediate portion 240a therebetween. The paddle 226a can be configured to support, lift, shift, and/or otherwise interact with an object at least primarily via contact between the first major surface 230a and the object.

The end effector 156a can further include wings 242a, 244a extending proximally from the paddle 226a and spaced apart from one another at superior and inferior sides, respectively, of the cylindroid shell 210a. The end effector axis 202a can extend through the wings 242a, 244a and through the cylindroid shell 210a within 10 degrees of perpendicular to (e.g., within 5 degrees of perpendicular to and/or substantially perpendicular to) a first rotational interface 246a between the wing 242a and the cylindroid shell 210a and within 10 degrees of perpendicular to (e.g., within 5 degrees of perpendicular to and/or substantially perpendicular to) a second rotational interface 248a between the wing 244a and the cylindroid shell 210a. The rounded shape of the cylindroid shell 210a at the major surface 224a can cause a gap 250a to persist between the paddle 226a and the wrist link 144a throughout a full range of motion of the end effector joint 160g.

Figure 38:
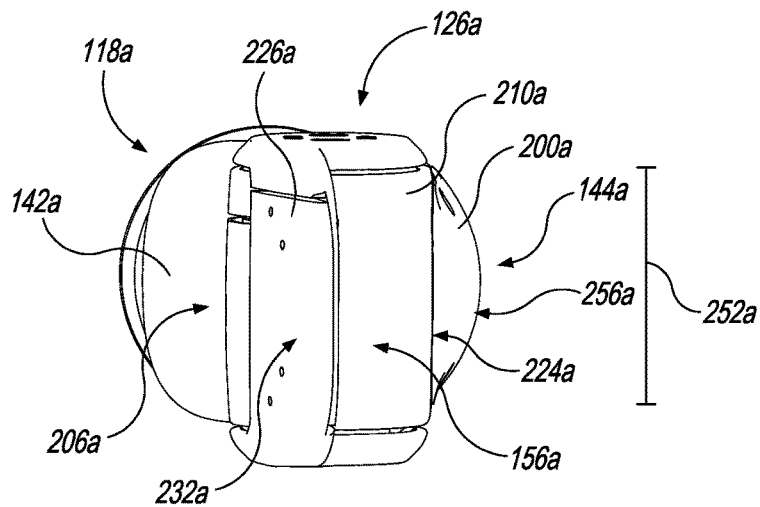
FIG. 38 is a front profile view of a portion of the first arm of the robot shown in FIG. 1 indicating a curvature of a first gripper of the first arm in a first plane.
Figure 39:
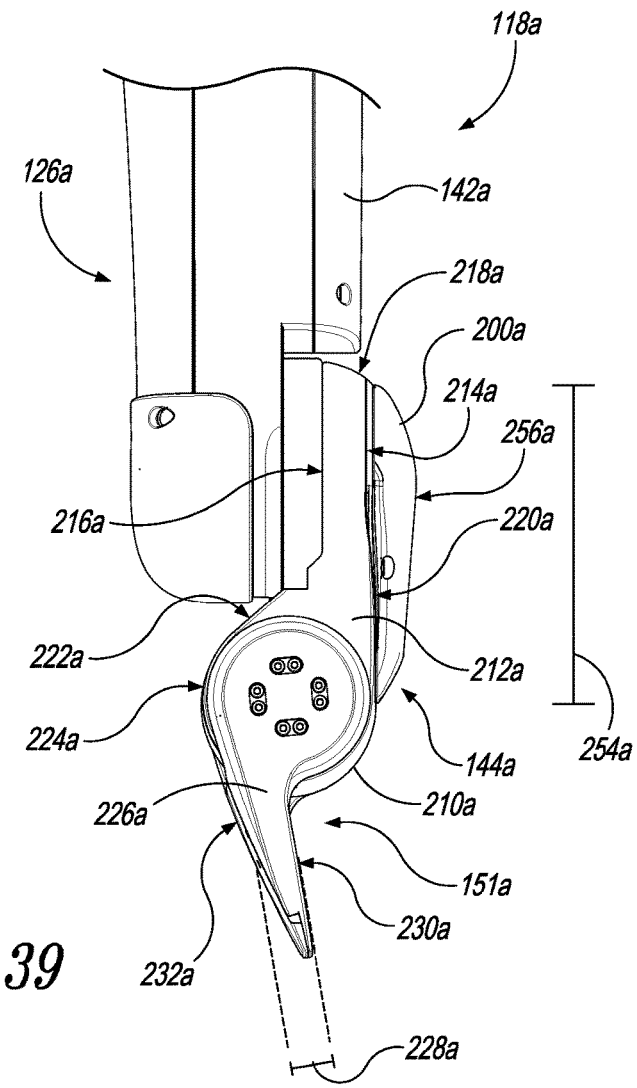
FIG. 39 is a top plan view of a portion of the first arm of the robot shown in FIG. 1 indicating a curvature of the first gripper of the first arm in a second plane perpendicular to the first plane.

The gripper 200a can extend along the first side 214a of the arcuate rim 208a and the first side 220a of the bridge 212a, such as along at least 50% or at least 75% of a collective area of these regions. As shown in FIGS. 38 and 39, the gripper 200a can define a gripper width 252a parallel to the end effector axis 202a and a gripper length 254a perpendicular to the gripper width 252a and perpendicular to the end effector axis 202a. In at least some cases, the gripper length 254a is greater than the gripper width 252a, such as at least 25% greater or at least 50% greater. The gripper 200a can include a gripping surface 256a that is convex along both the gripper length 254a and the gripper width 252a. As shown in FIG. 39, a more proximal portion of the gripper 200a at the arcuate rim 208a can protrude medially to a greater extent than a more distal portion of the gripper 200a at the bridge 212a. In contrast, as shown in FIG. 38, a convex shape of the gripping surface 256a along the gripper width 252a can be symmetrical. As further discussed below, the shape of the gripping surface 256a can be useful, for example, to facilitate forming a rolling frictional interface between the gripper 200a and a side surface of an object to be manipulated.

The gripper 200a can be configured to promote frictional contact with an object. In at least some cases, the gripper 200a has a material composition at least at the gripping surface 256a that promotes a relatively high coefficient of friction between the gripper 200a and an object. Suitable materials for the gripper 200a include elastomeric materials, such as natural rubber, nitrile rubber, butyl rubber, silicone, polyurethane, and neoprene, among others. Unlike the gripper 200a, the frame 206a and the paddle 226a can be configured for strength as a higher priority than grip. Suitable materials for the frame 206a and the paddle 226a include metal (e.g., aluminum) and hard plastics (e.g., acrylonitrile butadiene styrene), among others. Indeed, in at least some cases, it is useful for the paddle 226a to be low friction to facilitate smooth sliding contact with an object to be manipulated as the paddle 226a is positioned relative to the object. Accordingly, and average hardness of the gripper 200a at the gripping surface 256a can be less (e.g., at least 80% less and/or at least 90% less on a Shore durometer scale) than average hardness of the paddle 226a at the first major surface 230a. In addition or alternatively, a coefficient of friction at a contact pressure of 0.05 megapascal between the gripping surface 256a and a material (e.g., cardboard) typical of an object to be manipulated can be greater (e.g., at least 20% greater and/or at least 40% greater) than a coefficient of friction at a contact pressure of 0.05 megapascal between the first major surface 230a of the paddle 226a and the material.

Robotic Manipulation of Objects

The robot 100 can be configured to use the grippers 200a, 200b to manipulate an object, such as a cardboard box or a plastic tote. FIGS. 40-56 are illustrations of portions of the arms 118a, 118b and an object 300 at different respective times during three examples of object-manipulating methods in accordance with at least some embodiments of the present technology. The object 300 can define an object width 304 and can have a first side surface 306 and a second side surface 308 opposite to one another and spaced apart from one another along the object width 304. The object 300 can further include a bottom surface 310 extending between the first and second side surfaces 306, 308. FIGS. 40-56 also show a shelf 302 that initially supports the object 300 during the methods. The shelf 302 can have a support surface 312 in contact with the bottom surface 310 while the object is at rest on the shelf 302. For simplicity, aspects of object-manipulating methods in accordance with at least some embodiments of the present technology are described herein primarily in the context of the robot 100. It should be understood, however, that these and other object-manipulating methods in accordance with at least some embodiments of the present technology can likewise be practiced in other suitable contexts. The object-manipulating methods shown in FIGS. 40-56 can, among other things, be methods for using the robot 100 to move the object 300 from the support surface 312. For clarity of illustration, portions of the arms 118a, 118b proximal to the lower arm links 142a, 142b and portions of the robot 100 other than the arms 118a, 118b are not shown in FIGS. 40-56. FIGS. 40-56 are further described below with occasional reference to features shown in FIGS. 1-39.

Figure 40:
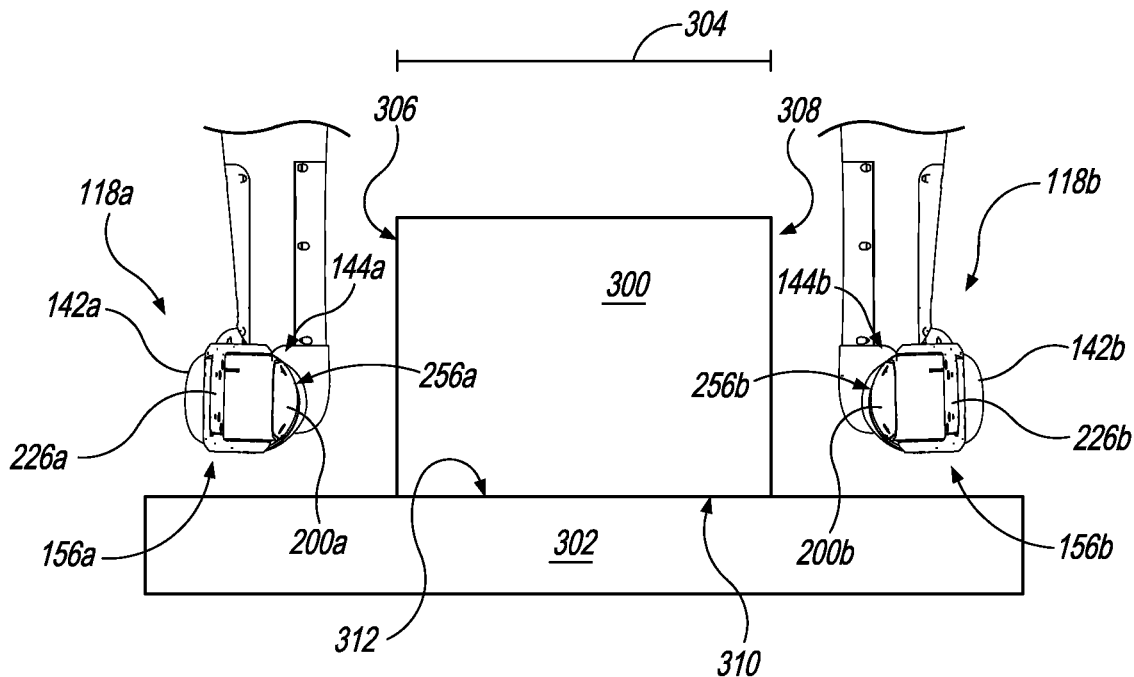
FIGS. 40-47 are illustrations of portions of the first and second arms of the robot shown in FIG. 1 and associated structures at different respective times during a first object-manipulating method in accordance with at least some embodiments of the present technology.

As shown in FIG. 40, when the object 300 is in its initial state, the bottom surface 310 can be entirely or nearly entirely in contact with the support surface 312 such that there is little or no room for positioning the end effectors 156a, 156b below the object 300. As discussed above, supporting an object from below tends to be more reliable and less damaging than supporting an object from the sides. Accordingly, as part of the methods shown in FIGS. 40-56, the robot 100 can be configured to use the grippers 200a, 200b to manipulate the object 300 to allow the end effectors 156a, 156b to be positioned below the object 300 to provide this support. For example, the robot 100 can be configured to move at least a portion of the bottom surface 310 away from the support surface 312 at least primarily by applying force to the object 300 via a frictional interface between the gripping surface 256a and the first side surface 306 and/or via a frictional interface between the gripping surface 256b and the second side surface 308.

Figure 41:
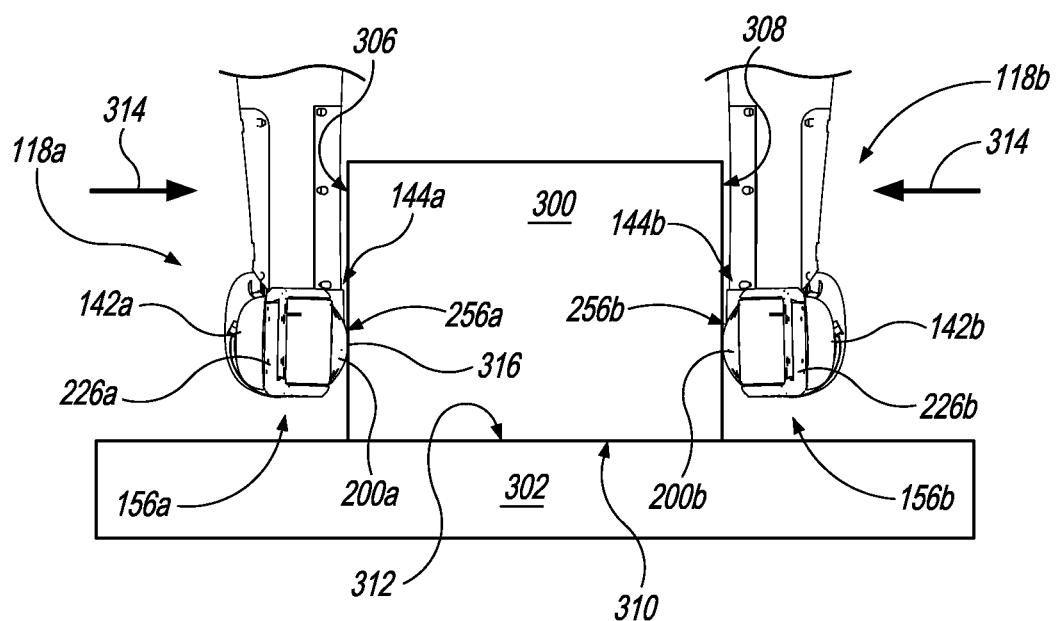

FIGS. 40-47 show different respective times during a first object-manipulating method in accordance with at least some embodiments of the present technology. The first method can begin with the lower arm links 142a, 142b, the wrist links 144a, 144b, the end effectors 156a, 156b, the lower arm joints 160e, 160l, the wrist joints 160f, 160m, and the end effector joints 160g, 160n in their positions corresponding to the positions when the robot 100 is in its first state (FIGS. 1-3). As shown in FIGS. 40 and 41, the first method can include contacting the grippers 200a, 200b and the first and second side surfaces 306, 308 of the object 300, respectively. In at least some cases, this includes moving the grippers 200a, 200b inwardly toward the object 300 in the direction of arrows 314. This can be actuated via one, some, or all of the arm actuator 174b and the distal shoulder joint 160b, the arm actuator 174i and the distal shoulder joint 160i, the arm actuator 174c and the upper arm joint 160c, and the arm actuator 174j and the upper arm joint 160j.

Figure 42:
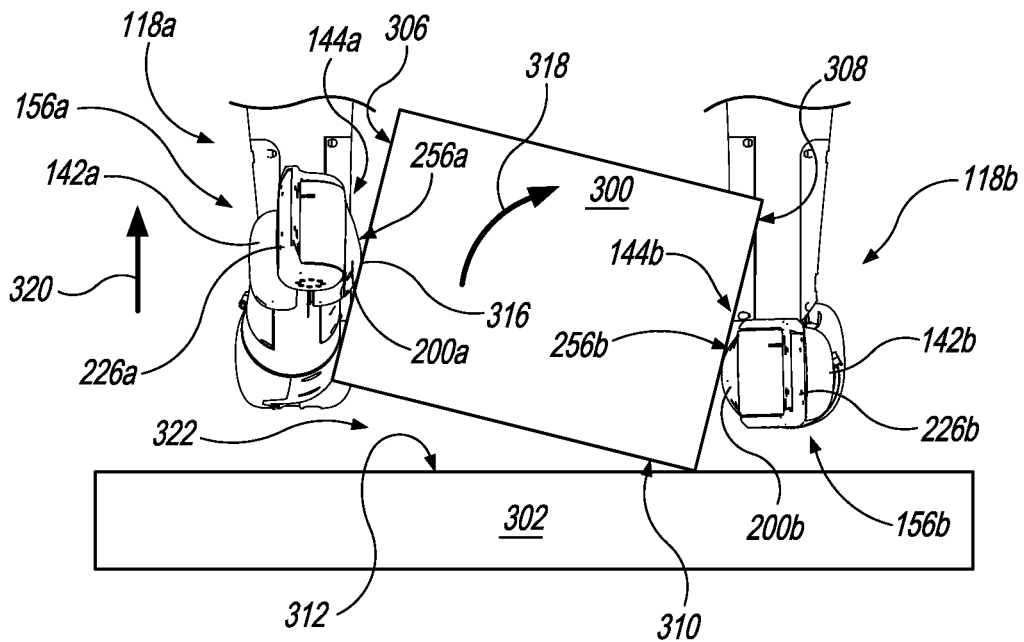

As shown in FIGS. 42, the first method can further include applying force from the arm 118a on the object 300 via a first frictional interface 316 between the gripping surface 256a and the first side surface 306 to at least partially cause the object 300 to rotate in a first direction 318 relative to the support surface 312. While applying force from the arm 118a on the object 300 via the first frictional interface 316, the arm 118b can brace the object 300 via the gripping surface 256b and the second side surface 308. In at least some cases, the first direction 318 is within 10 degrees of perpendicular to (e.g., within 5 degrees of perpendicular to and/or substantially perpendicular to) the support surface 312. The gripper 200a can move at least primarily upwards in the direction indicated by arrow 320 while applying force from the arm 118a on the object 300 via the first frictional interface 316. In these and other cases, the first frictional interface 316 can be a rolling interface and the object 300 can also rotate in the first direction 318 relative to the gripper 200a. Alternatively, the first frictional interface 316 can be a static interface and the gripper 200a can rotate relative to the support surface 312 in concert with the object 300, such as via the arm actuator 174e and the lower arm joint 160e.

Figure 43:
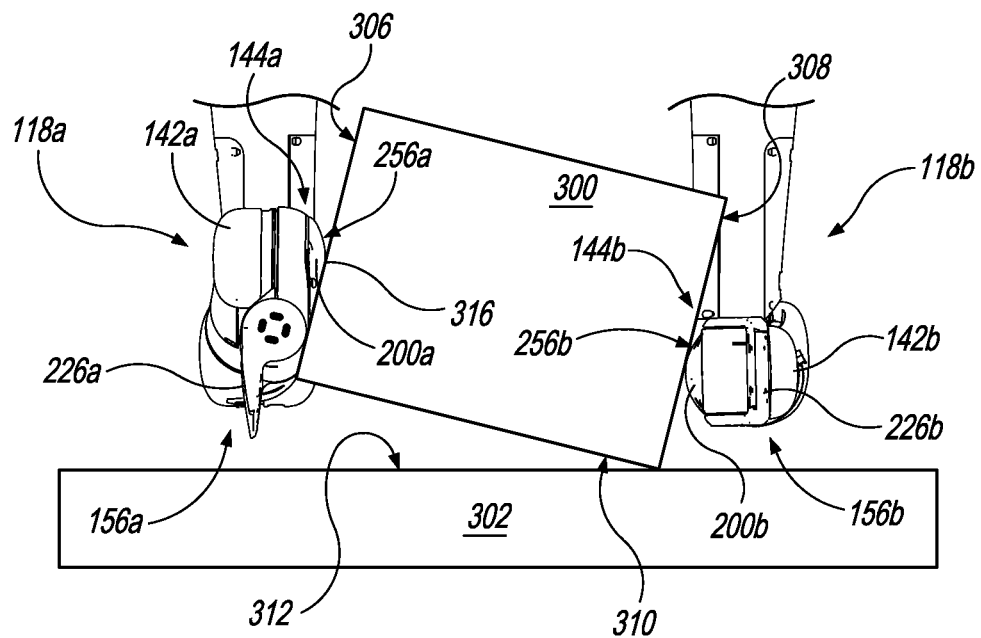
Figure 44:
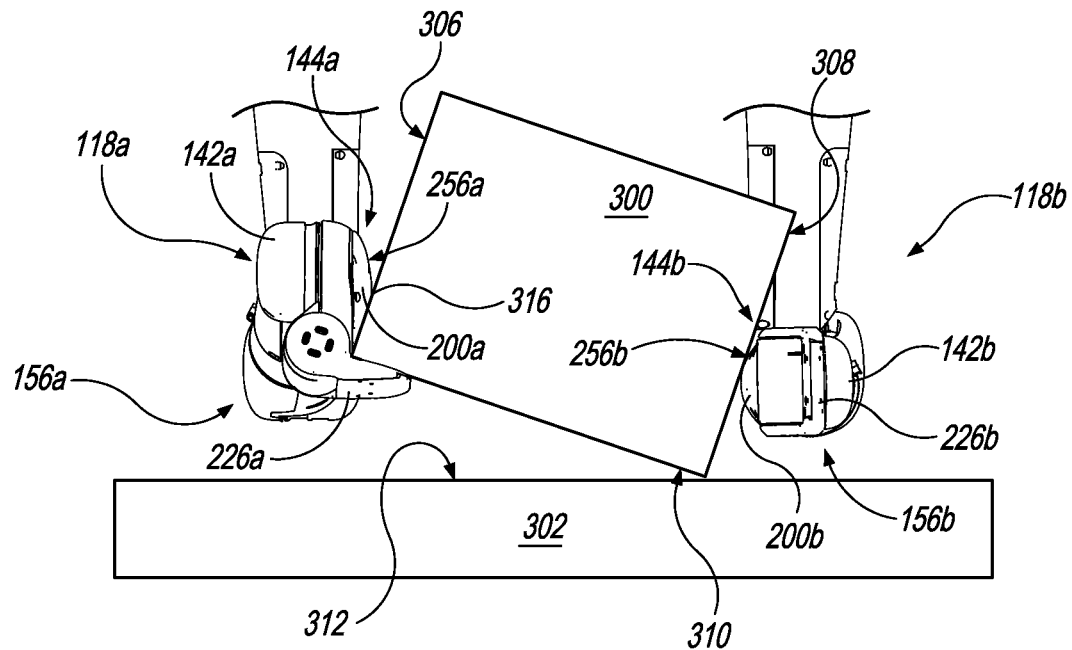

Applying force from the arm 118a on the object 300 via the first frictional interface 316 can at least partially cause the first side surface 306 to move away from the support surface 312. This can create a gap 322 between the bottom surface 310 and the support surface 312 sufficiently large to allow the object 300 to be supported from below. Accordingly, as shown in FIGS. 43 and 44, the first method can further include moving the end effector 156a into the gap 322 and contacting the end effector 156a and the bottom surface 310 after the first side surface 306 moves away from the support surface 312. Movements leading to contacting the end effector 156a and the bottom surface 310 can occur while and/or after applying force from the arm 118a on the object 300 via the first frictional interface 316. As shown in FIGS. 42 and 43, these movements can include rotating the wrist link 144a relative to the lower arm link 142a about the wrist axis 204a via the arm actuator 174f and the wrist joint 160f. As shown in FIGS. 43 and 44, these movements can further include rotating the end effector 156a relative to the gripper 200a about the end effector axis 202a via the arm actuator 174g and the wrist joint 160f. One or both of the movements shown in FIGS. 42-44 can at least partially cause the end effector 156a to move into contact with the bottom surface 310.

Figure 45:
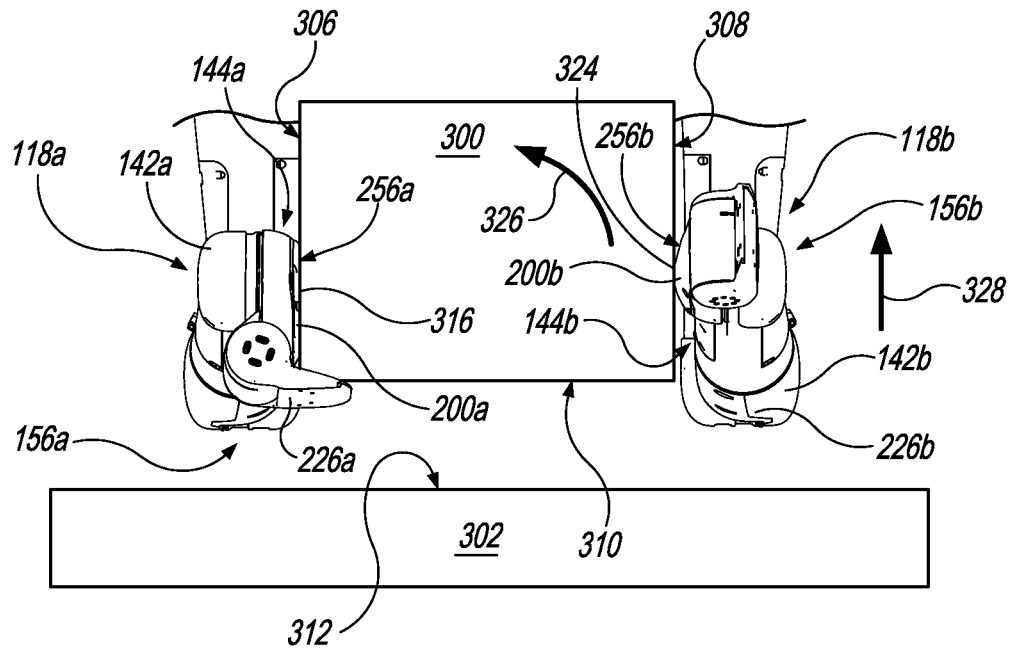

As shown in FIG. 45, the first method can further include applying force from the arm 118b on the object 300 via a second frictional interface 324 between the gripping surface 256b and the second side surface 308. In some cases, this occurs after the end effector 156a moves into contact with the bottom surface 310 such that the object 300 is well supported below the first side surface 306 while applying force from the arm 118b on the object 300 via a second frictional interface 324. In these and other cases, applying force from the arm 118b on the object 300 via a second frictional interface 324 can at least partially cause the object 300 to rotate in a second direction 326 relative to the support surface 312. While applying force from the arm 118b on the object 300 via the second frictional interface 324, the arm 118a can brace the object 300 via the gripping surface 256a and the second side surface 308 and/or via the end effector 156a and the bottom surface 310. The second direction 326 can be opposite to the first direction 318. Furthermore, the second direction 326 can be within 10 degrees of perpendicular to (e.g., within 5 degrees of perpendicular to and/or substantially perpendicular to) the support surface 312. The gripper 200b can move at least primarily upwards in the direction indicated by arrow 328 while applying force from the arm 118b on the object 300 via the second frictional interface 324. In these and other cases, the second frictional interface 324 can be a rolling interface and the object 300 can also rotate in the second direction 326 relative to the gripper 200b. Alternatively, the second frictional interface 324 can be a static interface and the gripper 200b can rotate relative to the support surface 312 in concert with the object 300, such as via the arm actuator 174*l* and the lower arm joint 160*l*.

Figure 46:
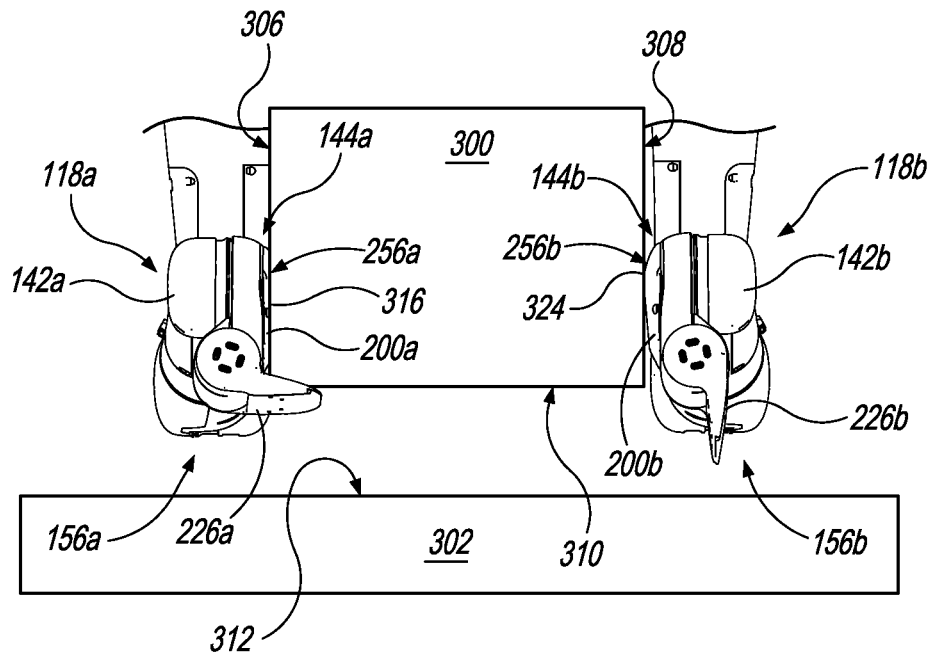
Figure 47:
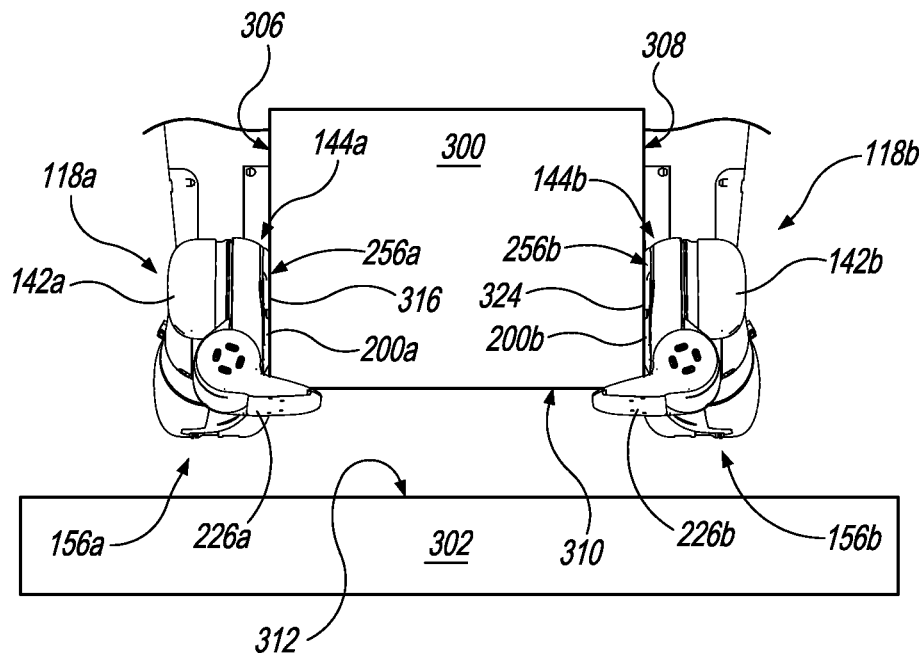

Applying force from the arm 118*b* on the object 300 via the second frictional interface 324 can at least partially cause the second side surface 308 to move away from the support surface 312. This can enlarge the gap 322 between the bottom surface 310 and the support surface 312. As shown in FIG. 45, rotation of the object in the second direction 326 can at least partially counteract rotation of the object 300 in the first direction 318 such that the object 300 is restored to an upright position in which the bottom surface 310 is within 10 degrees of parallel to (e.g., within 5 degrees of parallel to and/or substantially parallel to) the support surface 312 and is spaced apart from the support surface 312 by a sufficient distance to admit the end effector 156*b*. Accordingly, as shown in FIGS. 46 and 47, the first method can further include moving the end effector 156*b* into the gap 322 and contacting the end effector 156*b* and the bottom surface 310 after the second side surface 308 moves away from the support surface 312. Movements leading to contacting the end effector 156*b* and the bottom surface 310 can occur while and/or after applying force from the arm 118*b* on the object 300 via the second frictional interface 324. As shown in FIGS. 45 and 46, these movements can include rotating the wrist link 144*b* relative to the lower arm link 142*b* about the wrist axis 204*b* via the arm actuator 174*m* and the wrist joints 160*m*. As shown in FIGS. 46 and 47, these movements can further include rotating the end effector 156*b* relative to the gripper 200*b* about the end effector axis 202*b* via the arm actuator 174*n* and the wrist joint 160*m*. One or both of the movements shown in FIGS. 45-47 can at least partially cause the end effector 156*b* to move into contact with the bottom surface 310.

After the preceding movements, the object 300 can be well supported against horizontal displacement by the grippers 200*a*, 200*b* and well supported against vertical displacement by gravity and the end effectors 156*a*, 156*b*. Thus, the first method can include at least partially supporting a weight of the object 300 via the end effectors 156*a*, 156*b* while the end effectors are in contact with the bottom surface 310. The first method can also include moving the object 300 to another location, such as by bipedal locomotion using the legs 120*a*, 120*b*, while at least partially supporting the weight of the object 300 via the end effectors 156*a*, 156*b*.

In at least some cases, inward force on the object 300 via the first and second frictional interfaces 316, 324 is lessened after the end effectors 156*a*, 156*b* are in position to support the object 300 from below. This can be useful, for example, to further reduce the possibility of damaging the object 300. Furthermore, supporting the object 300 from below can be relatively independent of friction. Accordingly, a coefficient of friction between the gripper 200*a* and the first side surface 306 while applying force from the arm 118*a* on the object 300 to at least partially cause the first side surface 306 to move away from the support surface 312 can be greater (e.g., at least 50% greater) than a coefficient of friction between the end effector 156*a* and the bottom surface 310 while at least partially supporting the weight of the object 300 via the end effectors 156*a*, 156*b*. Similarly, a coefficient of friction between the gripper 200*b* and the second side surface 308 while applying force from the arm 118*b* on the object 300 to at least partially cause the second side surface 308 to move away from the support surface 312 can be greater (e.g., at least 50% greater) than a coefficient of friction between the end effector 156*b* and the bottom surface 310 while at least partially supporting the weight of the object 300 via the end effectors 156*a*, 156*b*.

Figure 48:
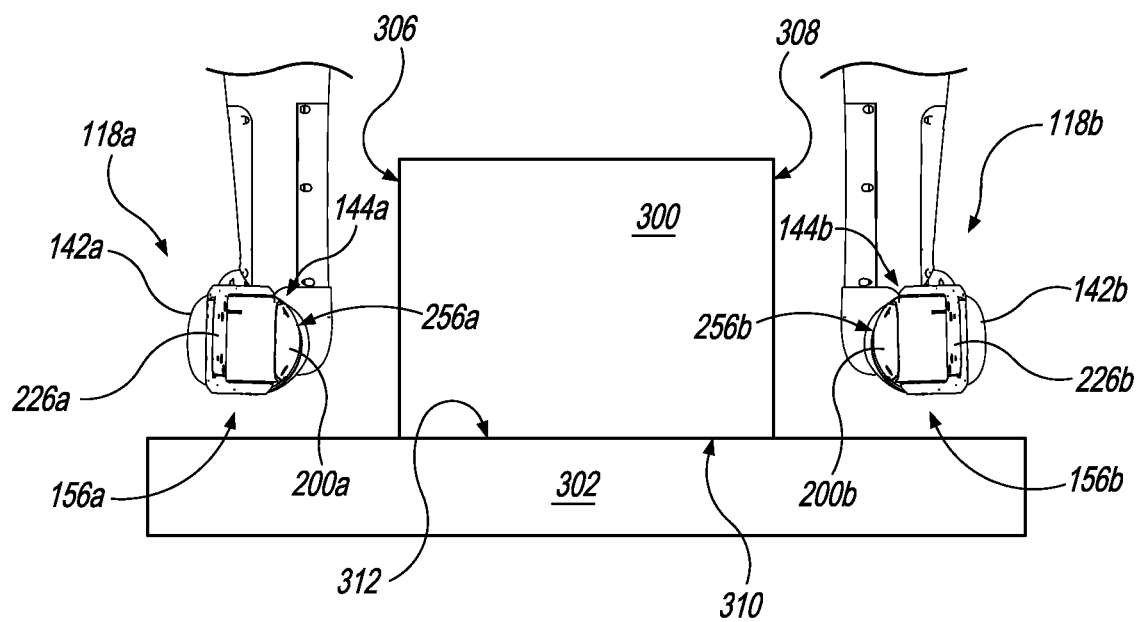
FIGS. 48-52 are illustrations of portions of the first and second arms of the robot shown in FIG. 1 and associated structures at different respective times during a second object-manipulating method in accordance with at least some embodiments of the present technology.
Figure 49:
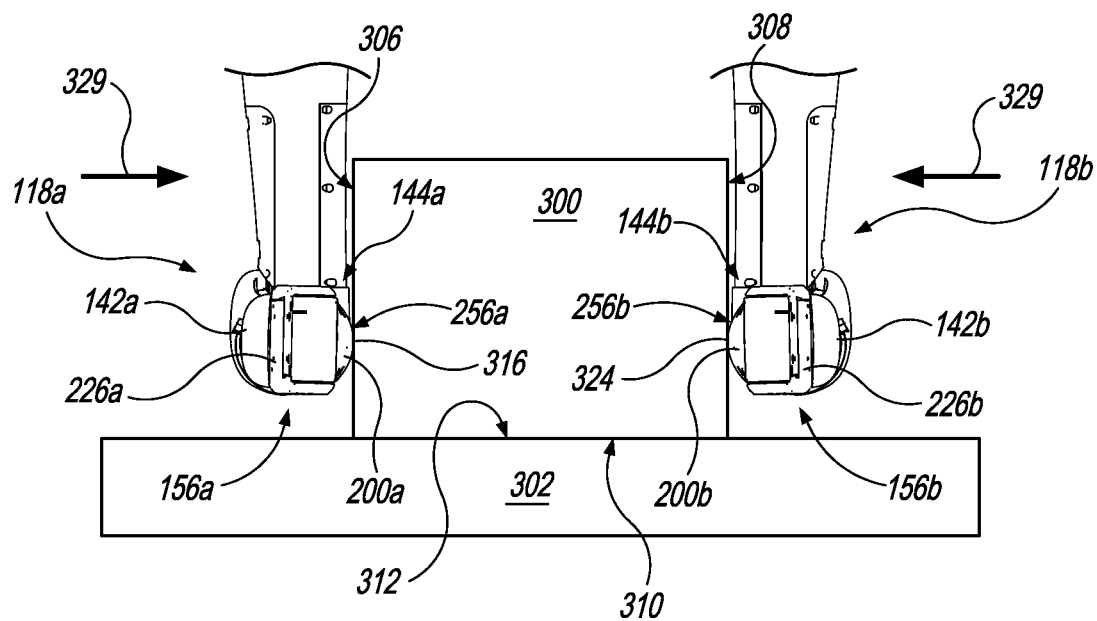

FIGS. 48-52 show different respective times during a second object-manipulating method in accordance with at least some embodiments of the present technology. Like the first method shown in FIGS. 40-47, the second method can begin with the lower arm links 142*a*, 142*b*, the wrist links 144*a*, 144*b*, the end effectors 156*a*, 156*b*, the lower arm joints 160*e*, 160*l*, the wrist joints 160*f*, 160*m*, and the end effector joints 160*g*, 160*n* in their positions corresponding to the positions when the robot 100 is in its first state (FIGS. 1-3). As shown in FIGS. 48 and 49, the second method can include contacting the grippers 200*a*, 200*b* and the first and second side surfaces 306, 308 of the object 300, respectively. In at least some cases, this includes moving the grippers 200*a*, 200*b* inwardly toward the object 300 in the direction of arrows 329. This can be actuated via one, some, or all of the arm actuator 174*b* and the distal shoulder joint 160*b*, the arm actuator 174*i* and the distal shoulder joint 160*i*, the arm actuator 174*c* and the upper arm joint 160*c*, and the arm actuator 174*j* and the upper arm joint 160*j*.

Figure 50:
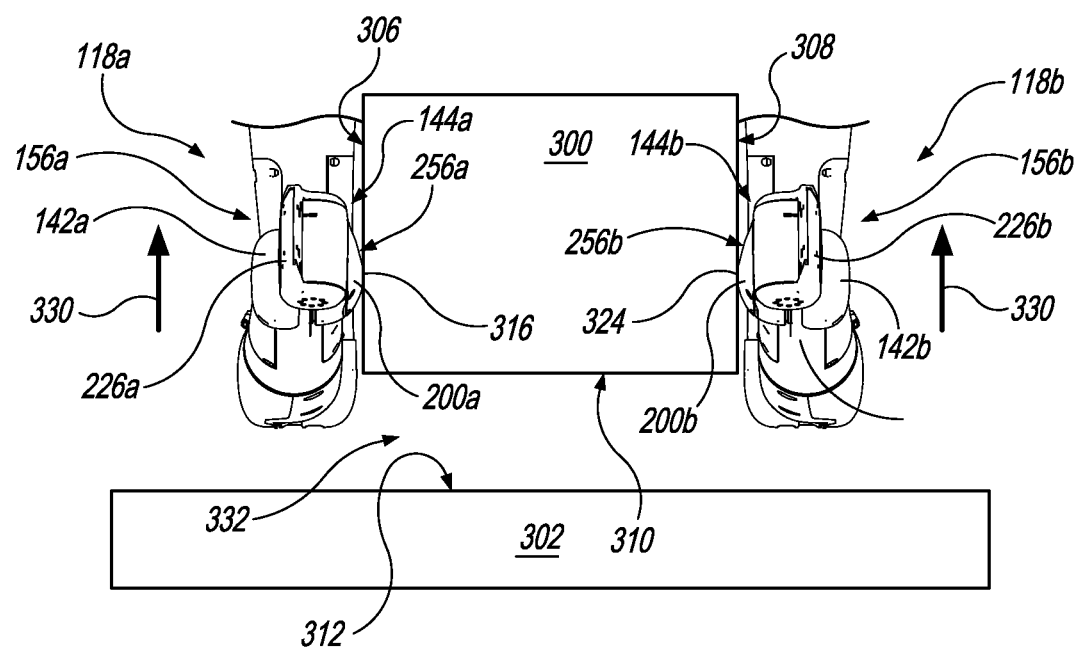
Figure 51:
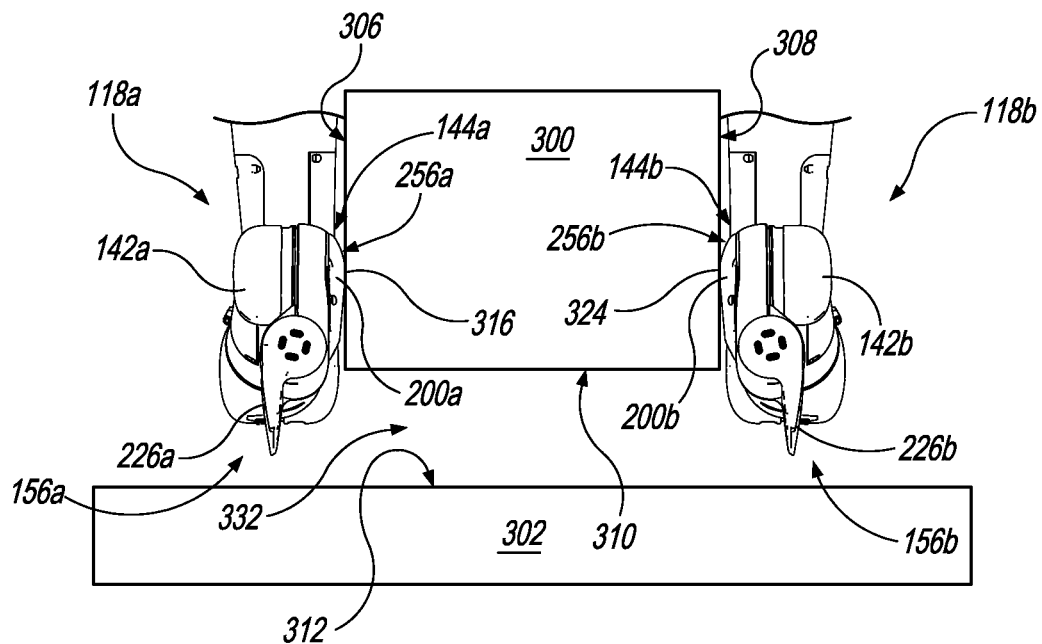
Figure 52:
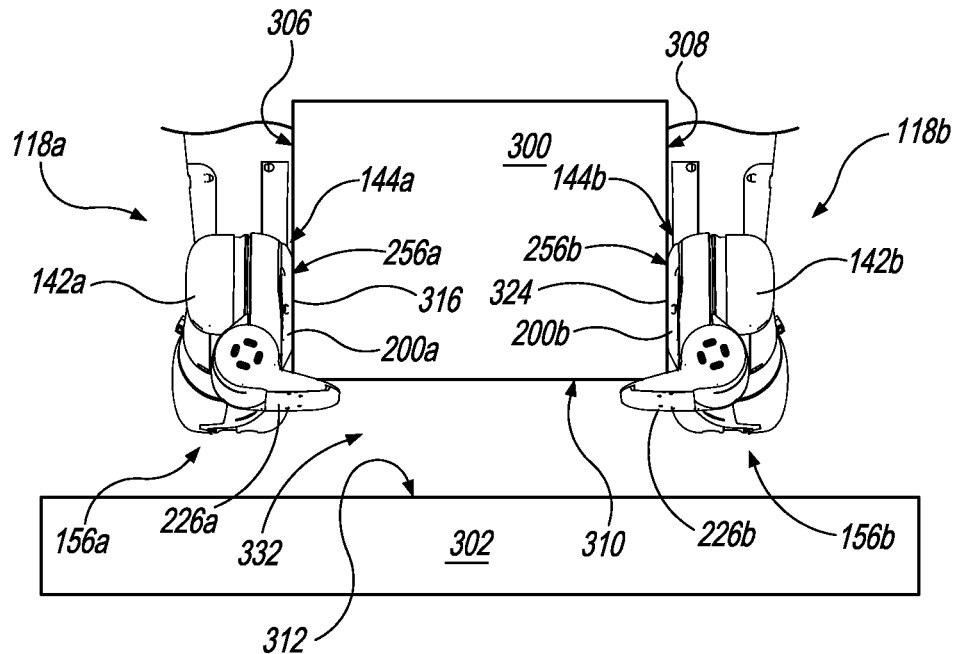
Figure 53:
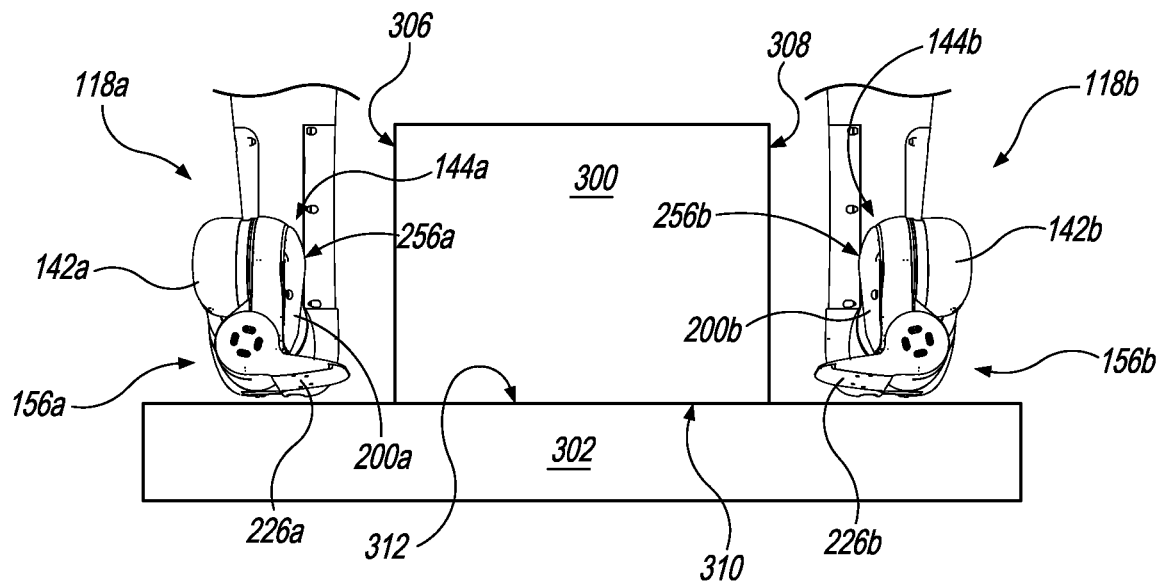
FIGS. 53-56 are illustrations of portions of the first and second arms of the robot shown in FIG. 1 and associated structures at different respective times during a third object-manipulating method in accordance with at least some embodiments of the present technology.

As shown in FIG. 50, the second method can further include simultaneously applying force from the arms 118*a*, 118*b* on the object 300 via the first and second frictional interfaces 316, 324, respectively, to at least partially cause the object 300 to move away from the support surface 312. The grippers 200*a*, 200*b* can move at least primarily upwards in the direction indicated by arrows 330 while simultaneously applying force from the arms 118*a*, 118*b* on the object 300 via the first and second frictional interfaces 316, 324, respectively. This can create a gap 332 between the bottom surface 310 and the support surface 312 sufficiently large to allow the object 300 to be supported from below. Accordingly, as shown in FIGS. 51 and 52, the second method can further include moving the end effectors 156*a*, 156*b* into the gap 332 and contacting the end effectors 156*a*, 156*b* and the bottom surface 310 after the bottom surface 310 moves away from the support surface 312. Movements leading to contacting the end effectors 156*a*, 156*b* and the bottom surface 310 can occur during and/or after applying force from the arms 118*a*, 118*b* on the object 300 via the first and second frictional interfaces 316, 324. Furthermore, these movements can occur synchronously or asynchronously for the respective end effectors 156*a*, 156*b*. As shown in FIGS. 50 and 51, these movements can include rotating the wrist links 144*a*, 144*b* relative to the lower arm links 142*a*, 142*b* about the wrist axes 204*a*, 204*b* via the arm actuators 174*f*, 174*m* and the wrist joints 160*f*, 160*m*. As shown in FIGS. 51 and 52, these movements can further include rotating the end effectors 156*a*, 156*b* relative to the grippers 200*a*, 200*b* about the end effector axes 202*a*, 202*b* via the arm actuators 174*g*, 174*n* and the end effector joints 160*g*, 160*n*. One or both of the movements shown in FIGS. 51-53 can at least partially cause the end effectors 156*a*, 156*b* to move into contact with the bottom surface 310.

After the preceding movements, the object 300 can be well supported against horizontal displacement by the grippers 200*a*, 200*b* and well supported against vertical displacement by gravity and the end effectors 156*a*, 156*b*. Thus, the second method can include at least partially supporting a weight of the object 300 via the end effectors 156*a*, 156*b* while the end effectors are in contact with the bottom surface 310. The second method can also include moving the object 300 to another location, such as by bipedal locomotion using the legs 120*a*, 120*b*, while at least partially supporting the weight of the object 300 via the end effectors 156*a*, 156*b*.

In at least some cases, inward force on the object 300 via the first and second frictional interfaces 316, 324 is lessened after the end effectors 156a, 156b are in position to support the object 300 from below. This can be useful, for example, to further reduce the possibility of damaging the object 300. Furthermore, supporting the object 300 from below can be relatively independent of friction. Accordingly, a coefficient of friction between the gripper 200a and the first side surface 306 while simultaneously applying force from the arms 118a, 118b on the object 300 to at least partially cause the object 300 to move away from the support surface 312 can be greater (e.g., at least 50% greater) than a coefficient of friction between the end effector 156a and the bottom surface 310 while at least partially supporting the weight of the object 300 via the end effectors 156a, 156b. Similarly, a coefficient of friction between the gripper 200b and the second side surface 308 while simultaneously applying force from the arms 118a, 118b on the object 300 to at least partially cause the object 300 to move away from the support surface 312 can be greater (e.g., at least 50% greater) than a coefficient of friction between the end effector 156b and the bottom surface 310 while at least partially supporting the weight of the object 300 via the end effectors 156a, 156b.

FIGS. 53-56 show different respective times during a third object-manipulating method in accordance with at least some embodiments of the present technology. Unlike the first and second methods shown in FIGS. 40-52, the wrist links 144a, 144b, the end effectors 156a, 156b, the wrist joints 160f, 160m, and the end effector joints 160g, 160n can be at least partially pre-positioned to support the object 300 from below. For example, from their relative positions when the robot 100 is in its first state (FIGS. 1-3), the wrist links 144a, 144b can be rotated relative to the lower arm links 142a, 142b about the wrist axes 204a, 204b via the arm actuators 174f, 174m and the wrist joints 160f, 160m at least partially (e.g., at least 25% and/or at least 50%) toward their final relative positions when the end effectors 156a, 156b support the object 300 from below. Similarly, from their relative positions when the robot 100 is in its first state (FIGS. 1-3), the end effectors 156a, 156b can be rotated relative to the grippers 200a, 200b about the end effector axes 202a, 202b via the arm actuators 174g, 174n and the end effector joints 160g, 160n at least partially (e.g., at least 25% and/or at least 50%) toward their final relative positions when the end effectors 156a, 156b support the object 300 from below.

Figure 54:
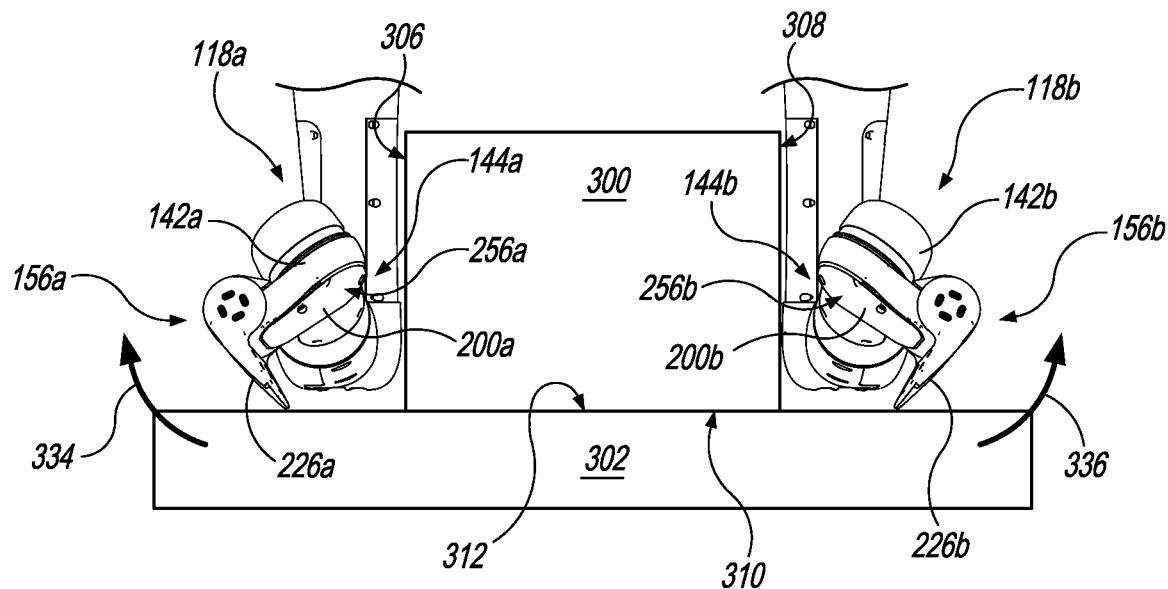
Figure 55:
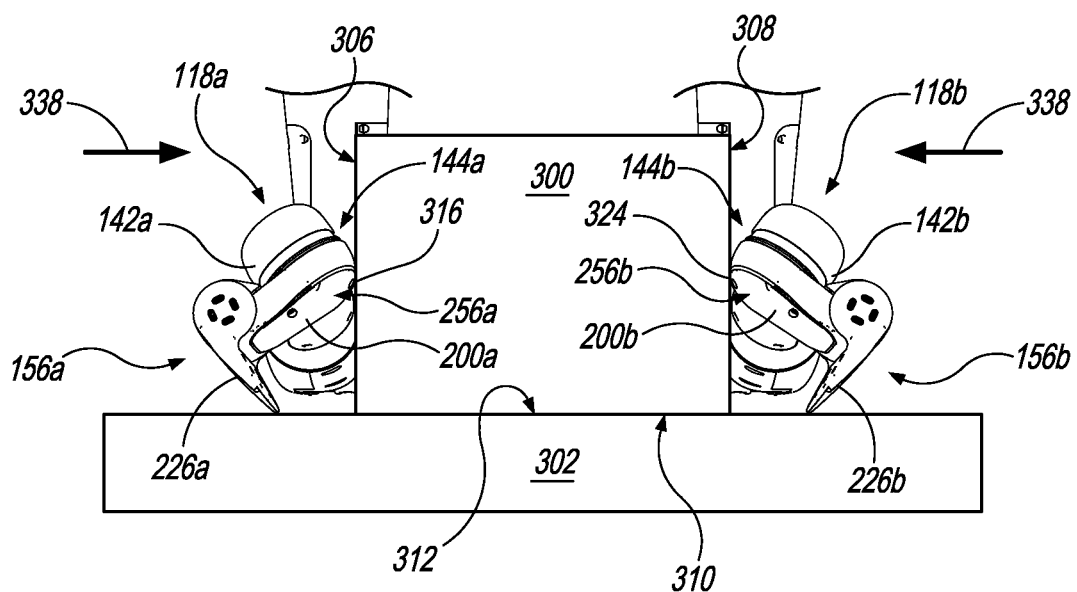

As shown in FIG. 54, the third method can include rotating the lower arm link 142a, the wrist link 144a, and the end effector 156a in the direction indicated by arrow 334 relative to more proximal portions of the arm 118a via the arm actuator 174e and the lower arm joint 160e. At the same or a different time, the third method can include rotating the lower arm link 142b, the wrist link 144b, and the end effector 156b in the direction indicated by arrow 336 relative to more proximal portions of the arm 118b via the arm actuator 174l and the lower arm joint 160l. As shown in FIG. 55, the third method can further include contacting proximal portions of the grippers 200a, 200b and the first and second side surfaces 306, 308 of the object 300, respectively. In at least some cases, this includes moving the grippers 200a, 200b inwardly toward the object 300 in the direction of the arrows 338. This can be actuated via one, some, or all of the arm actuator 174b and the distal shoulder joint 160b, the arm actuator 174i and the distal shoulder joint 160i, the arm actuator 174c and the upper arm joint 160c, and the arm actuator 174j and the upper arm joint 160j.

Figure 56:
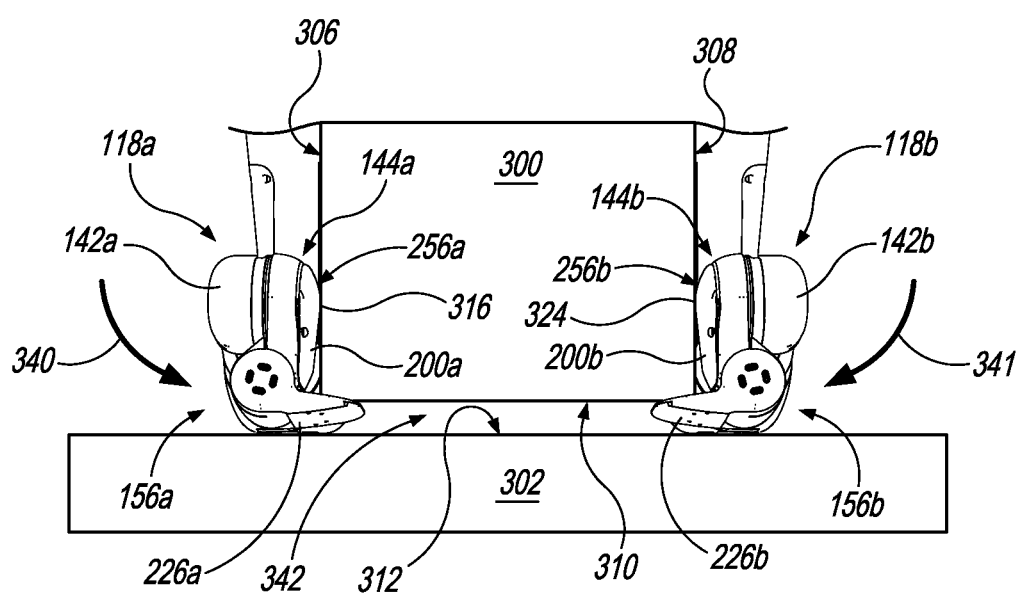

As shown in FIGS. 55 and 56, the third method can further include simultaneously applying force from the arms 118a, 118b on the object 300 via the first and second frictional interfaces 316, 324, respectively, to at least partially cause the object 300 to move away from the support surface 312. In this case, the first and second frictional interfaces 316, 324 are rolling interfaces and the force results at least primarily from rotation of the grippers 200a, 200b relative to the object 300 in the direction of the arrows 340, 341, respectively, rather than from upward movement of the grippers 200a, 200b relative to the support surface 312. The rotation can be actuated via the arm actuators 174e, 174l and the lower arm joints 160e, 160l. The shapes and relative positions of the grippers 200a, 200b relative to the end effectors 156a, 156b can facilitate the translation of this rotation of the grippers 200a, 200b into upward movement of the object 300. This can create a gap 342 between the bottom surface 310 and the support surface 312 sufficiently large to allow the object 300 to be supported from below. Accordingly, as shown in FIGS. 55 and 56, the third method can further include moving the end effectors 156a, 156b into the gap 342 and contacting the end effectors 156a, 156b and the bottom surface 310 after the bottom surface 310 moves away from the support surface 312.

After the preceding movements, the object 300 can be well supported against horizontal displacement by the grippers 200a, 200b and well supported against vertical displacement by gravity and the end effectors 156a, 156b. Thus, the third method can include at least partially supporting a weight of the object 300 via the end effectors 156a, 156b while the end effectors are in contact with the bottom surface 310. The third method can also include moving the object 300 to another location, such as by bipedal locomotion using the legs 120a, 120b, while at least partially supporting the weight of the object 300 via the end effectors 156a, 156b.

In at least some cases, inward force on the object 300 via the first and second frictional interfaces 316, 324 is lessened after the end effectors 156a, 156b are in position to support the object 300 from below. This can be useful, for example, to further reduce the possibility of damaging the object 300. Furthermore, supporting the object 300 from below can be relatively independent of friction. Accordingly, a coefficient of friction between the gripper 200a and the first side surface 306 while simultaneously applying force from the arms 118a, 118b on the object 300 to at least partially cause the object 300 to move away from the support surface 312 can be greater (e.g., at least 50% greater) than a coefficient of friction between the end effector 156a and the bottom surface 310 while at least partially supporting the weight of the object 300 via the end effectors 156a, 156b. Similarly, a coefficient of friction between the gripper 200b and the second side surface 308 while simultaneously applying force from the arms 118a, 118b on the object 300 to at least partially cause the object 300 to move away from the support surface 312 can be greater (e.g., at least 50% greater) than a coefficient of friction between the end effector 156b and the bottom surface 310 while at least partially supporting the weight of the object 300 via the end effectors 156a, 156b.

It should be understood that the first, second, and third object-manipulating methods shown in FIGS. 40-56 are merely examples. Numerous other object-manipulating methods in accordance with at least some embodiments of the present technology are also possible.

CONCLUSION

This disclosure is not intended to be exhaustive or to limit the present technology to the precise forms disclosed herein.

Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms. Directional terms, such as "upper," "lower," "front," "back," "vertical," and "horizontal," may be used herein to express and clarify the relationship between various structures. It should be understood that such terms do not denote absolute orientation. Similarly, terms of anatomical direction, such as "distal" and "medial," may be used herein to express and clarify the relationship between various structures. In the context of the robot 100 and in the absence of a statement to the contrary, such terms refer to the robot 100 in the first state shown in FIGS. 1-3.

Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method of using a robot having arms to move an object from a support surface, the object defining an object width and having a first side surface, a second side surface spaced apart from the first side surface along the object width, and a bottom surface extending between the first and second side surfaces, the method comprising:
    contacting a gripper of a first one of the arms and the first side surface of the object;
    contacting a gripper of a second one of the arms and the second side surface of the object;
    applying force from the first one of the arms on the object via a rolling frictional interface between a convex gripping surface of the gripper of the first one of the arms and the first side surface of the object, wherein applying force from the first one of the arms on the object at least partially causes:
        relative rotation between the object and the gripper of the first one of the arms, the object to rotate in a first direction relative to the support surface, and
        the first side surface of the object to move away from the support surface; and
    applying force from the second one of the arms on the object via a rolling frictional interface between a convex gripping surface of the gripper of the second one of the arms and the second side surface of the object, wherein applying force from the second one of the arms on the object at least partially causes:
        relative rotation between the object and the gripper of the second one of the arms, the object to rotate in a second direction opposite to the first direction, and
        the second side surface of the object to move away from the support surface.

2. The method of claim 1, wherein the object is a cardboard box.

3. The method of claim 1, wherein the first and second directions are within 10 degrees of perpendicular to the support surface.

4. The method of claim 1, further comprising:
    contacting an end effector of the first one of the arms and the bottom surface of the object after the first side surface of the object moves away from the support surface;
    contacting an end effector of the second one of the arms and the bottom surface of the object after the second side surface of the object moves away from the support surface; and
    at least partially supporting a weight of the object via the end effector of the first one of the arms and the end effector of the second one of the arms while the end effector of the first one of the arms and the end effector of the second one of the arms are in contact with the bottom surface of the object.

5. The method of claim 4, further comprising moving the object by bipedal locomotion using legs of the robot while at least partially supporting the weight of the object via the end effector of the first one of the arms and the end effector of the second one of the arms.

6. The method of claim 4, wherein:
    a coefficient of friction between the gripper of the first one of the arms and the first side surface of the object while applying force from the first one of the arms on the object is greater than a coefficient of friction between the end effector of the first one of the arms and the bottom surface of the object while at least partially supporting the weight of the object via the end effector of the first one of the arms and the end effector of the second one of the arms; and a coefficient of friction between the gripper of the second one of the arms and the second side surface of the object while applying force from the second one of the arms on the object is greater than a coefficient of friction between the end effector of the second one of the arms and the bottom surface of the object while at least partially supporting the weight of the object via the end effector of the first one of the arms and the end effector of the second one of the arms.

7. The method of claim 1, wherein:
the first and second ones of the arms individually define an arm length extending from a body of the robot;
the first and second ones of the arms individually include an end effector distal to the gripper along the arm length;
the method further comprises rotating the end effector of the first one of the arms relative to the gripper of the first one of the arms after the first side surface of the object moves away from the support surface; and
rotating the end effector of the first one of the arms at least partially causes the end effector of the first one of the arms to move into contact with the bottom surface of the object.

8. The method of claim 7, wherein rotating the end effector of the first one of the arms relative to the gripper of the first one of the arms includes rotating the end effector of the first one of the arms relative to the gripper of the first one of the arms before the object rotates in the second direction.

9. The method of claim 8, further comprising rotating the end effector of the second one of the arms relative to the gripper of the second one of the arms after the second side surface of the object moves away from the support surface, wherein rotating the end effector of the second one of the arms at least partially causes the end effector of the second one of the arms to move into contact with the bottom surface of the object.

10. The method of claim 1, wherein:
the first and second ones of the arms individually define an arm length extending from a body of the robot;
the first and second ones of the arms individually include:
an end effector distal to the gripper along the arm length,
a wrist link carrying the gripper proximal to the end effector along the arm length, and
a lower arm link proximal to the wrist link along the arm length; and
the method further comprises rotating the wrist link of the first one of the arms relative to the lower arm link of the first one of the arms after the first side surface of the object moves away from the support surface.

11. The method of claim 10, wherein rotating the wrist link of the first one of the arms relative to the lower arm link of the first one of the arms includes rotating the wrist link of the first one of the arms relative to the lower arm link of the first one of the arms before the object rotates in the second direction.

12. The method of claim 11, further comprising rotating the wrist link of the second one of the arms relative to the lower arm link of the second one of the arms after the second side surface of the object moves away from the support surface.

13. A method of using a robot having arms to move an object from a support surface, the object defining an object width and having a first side surface, a second side surface spaced apart from the first side surface along the object width, and a bottom surface extending between the first and second side surfaces, the method comprising:
contacting a gripper of a first one of the arms and the first side surface of the object;
contacting a gripper of a second one of the arms and the second side surface of the object;
applying force from the first one of the arms on the object via a rolling frictional interface between a convex gripping surface of the gripper of the first one of the arms and the first side surface of the object and simultaneously applying force from the second one of the arms on the object via a rolling frictional interface between a convex gripping surface of the gripper of the second one of the arms and the second side surface of the object, wherein simultaneously applying force from the first one of the arms on the object and applying force from the second one of the arms on the object at least partially causes:
relative rotation between the object and the gripper of the first one of the arms, relative rotation between the object and the gripper of the second one of the arms, and
the object to move away from the support surface; and
moving an end effector of the first one of the arms and an end effector of the second one of the arms into contact with the bottom surface of the object after the object moves away from the support surface.

14. The method of claim 13, wherein:
the first and second ones of the arms individually include a wrist link carrying the gripper;
for the first and second ones of the arms individually, the wrist link is separated from the end effector by one degree of freedom;
moving the end effector of the first one of the arms into contact with the bottom surface of the object includes rotating the end effector of the first one of the arms relative to the wrist link of the first one of the arms; and
moving the end effector of the second one of the arms into contact with the bottom surface of the object includes rotating the end effector of the second one of the arms relative to the wrist link of the second one of the arms.

15. The method of claim 13, wherein:
the first and second ones of the arms individually define an arm length extending from a body of the robot;
the first and second ones of the arms individually include:
a wrist link carrying the gripper proximal to the end effector along the arm length, and
a lower arm link proximal to the wrist link along the arm length;
moving the end effector of the first one of the arms into contact with the bottom surface of the object includes rotating the end effector of the first one of the arms relative to the lower arm link of the first one of the arms; and
moving the end effector of the second one of the arms into contact with the bottom surface of the object includes rotating the end effector of the second one of the arms relative to the lower arm link of the second one of the arms.

16. The method of claim 13, further comprising at least partially supporting a weight of the object via the end effector of the first one of the arms and the end effector of the second one of the arms while the end effector of the first one of the arms and the end effector of the second one of the arms are in contact with the bottom surface of the object.

17. The method of claim 16, further comprising moving the object by bipedal locomotion using legs of the robot while at least partially supporting the weight of the object via the end effectors.

18. The method of claim 16, wherein:
a coefficient of friction between the gripper of the first one of the arms and the first side surface of the object while applying force from the first one of the arms on the object is greater than a coefficient of friction between the end effector of the first one of the arms and the bottom surface of the object while at least partially supporting the weight of the object via the end effector of the first one of the arms and the end effector of the second one of the arms; and
a coefficient of friction between the gripper of the second one of the arms and the second side surface of the object while applying force from the second one of the arms on the object is greater than a coefficient of friction between the end effector of the second one of the arms and the bottom surface of the object while at least partially supporting the weight of the object via the end effector of the first one of the arms and the end effector of the second one of the arms.

19. The method of claim 1, wherein the object is a plastic tote.

20. The method of claim 13, further comprising lessening inward force exerted on the object via the rolling frictional interfaces after moving the end effector of the first one of the arms and the end effector of the second one of the arms into contact with the bottom surface of the object.

* * * * *